United States Patent
Ebato

(10) Patent No.: US 7,734,162 B2
(45) Date of Patent: Jun. 8, 2010

(54) CAMERA SHAKING CORRECTING DEVICE, AND IMAGE PICKUP DEVICE

(75) Inventor: Takashi Ebato, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/222,333

(22) Filed: Aug. 7, 2008

(65) Prior Publication Data

US 2008/0304816 A1    Dec. 11, 2008

Related U.S. Application Data

(62) Division of application No. 11/268,641, filed on Nov. 8, 2005, now Pat. No. 7,424,212.

(30) Foreign Application Priority Data

Nov. 12, 2004  (JP)  .............................. 2004-329004
Nov. 26, 2004  (JP)  .............................. 2004-341504

(51) Int. Cl.
*G03B 17/00*   (2006.01)
*H04N 5/228*   (2006.01)

(52) U.S. Cl. .................................. 396/55; 348/208.99

(58) Field of Classification Search .................. 396/52, 396/53, 55; 348/208.99, 208.2
See application file for complete search history.

(56) References Cited

U.S. PATENT DOCUMENTS 5,617,176 A  *  4/1997  Matsuzawa et al. ........... 396/55
7,424,212 B2 *  9/2008  Ebato ........................... 396/53
2002/0054213 A1 *  5/2002  Kawahara et al. ........... 348/208
2003/0035053 A1     2/2003  Kyuma et al.
2005/0201741 A1 *  9/2005  Moriya ........................ 396/53

FOREIGN PATENT DOCUMENTS

| JP | A 63-8628  | 1/1988 |
| JP | A 5-204013 | 8/1993 |
| JP | A 5-204014 | 8/1993 |
| JP | A 6-98246  | 4/1994 |
| JP | 06-317824 A | 11/1994 |
| JP | A 8-101418 | 4/1996 |

OTHER PUBLICATIONS

Corresponding JPO Official communication.

* cited by examiner

*Primary Examiner*—W. B. Perkey
*Assistant Examiner*—Minh Q Phan
(74) *Attorney, Agent, or Firm*—Sheldon J. Moss; Chad M. Herring

(57) ABSTRACT

Output of a gyro sensor is read at intervals of control time ts, time integration is carried out, an integrated value is computed, and an amount of change in an integrated value is determined from a difference between the calculated integrated value and an integrated value of a previous time. Thereafter, on the basis of the amount of change and a delay time determined by a shaking correcting module and the control time, an addition value (an acceleration value of an integrated value of the current time) is computed in order to obtain an amount of movement of a shift lens which can compensate tilting of an optical axis of a lens. After the computed addition value is added to the integrated value of the current time, a control value for moving the shift lens is computed by using the integrated value after addition.

12 Claims, 19 Drawing Sheets

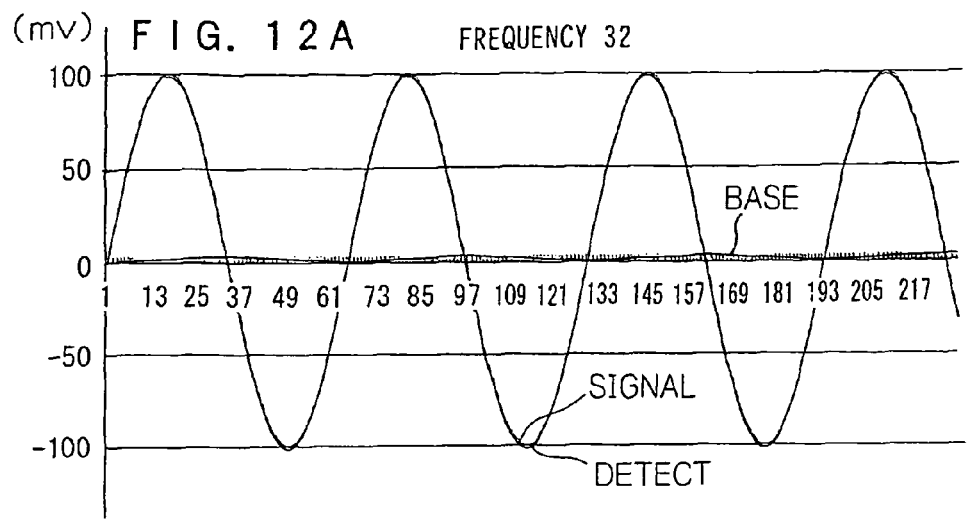
FIG. 12A FREQUENCY 32
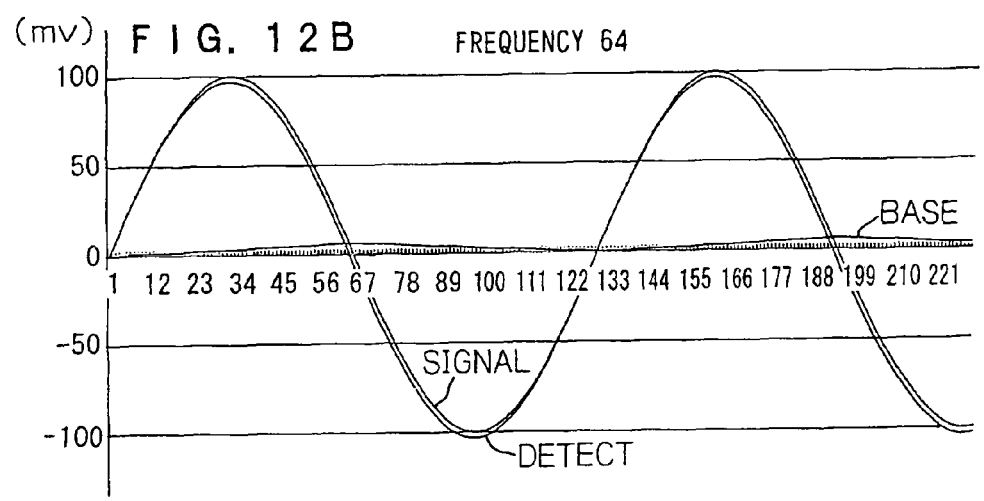
FIG. 12B FREQUENCY 64
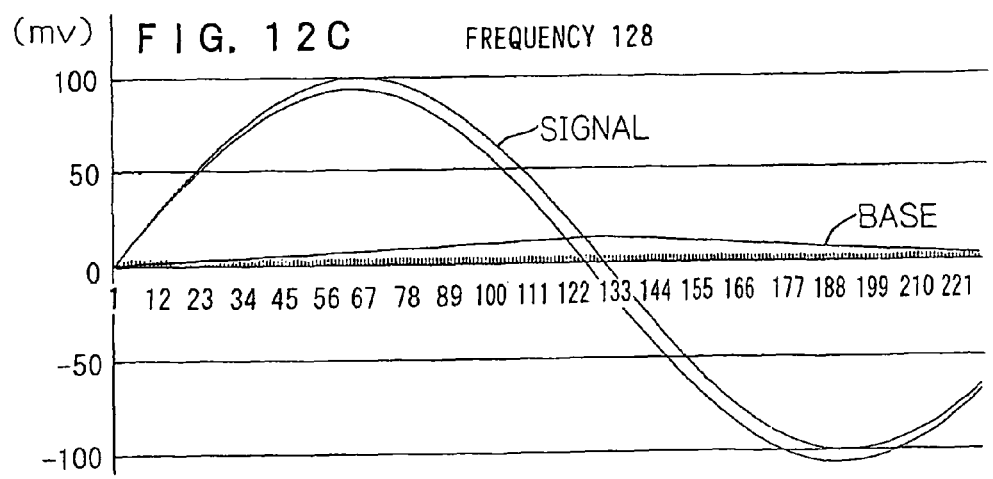
FIG. 12C FREQUENCY 128

CAMERA SHAKING CORRECTING DEVICE, AND IMAGE PICKUP DEVICE

CROSS-REFERENCE TO RELATED APPLICATIONS

This application claims priority under 35 U.S.C. 120 as a divisional of U.S. patent application Ser. No. 11/268,641, filed Nov. 8, 2005, the disclosure of which is incorporated herein by reference.

This application also claims priority under 35 U.S.C. 119 from Japanese Patent Application Nos. 2004-329004 and 2004-341504, the disclosures of which are incorporated herein by reference.

BACKGROUND OF THE INVENTION

1. Field of the Invention

The present invention relates to an image pickup device such as a digital still camera, a digital video camera, or the like which obtains image data corresponding to a photographed image, and in particular, relates to a camera shaking correcting method of an image pickup device equipped with an optical-type camera shaking correcting function, and to a camera shaking correcting device and an image pickup device.

2. Description of the Related Art

Of course among digital video cameras, digital still cameras, and the like, and among silver salt photographic cameras and the like as well, there are cameras equipped with a camera shaking correcting function which corrects blurring of a photographed image due to so-called camera shaking. The provision of a camera shaking correcting function is becoming standard in higher-end cameras.

Camera shaking correcting functions include electronic-type blurring correction in which, in accordance with shaking which is detected by using the correlation with an image, the data reading position from an image pickup element such as a CCD or from image data expanded in a memory is controlled, so that blurring caused by camera shaking does not arise in the photographed image. In addition, there is optical-type blurring correction in which, by using a sensor (e.g., a gyro sensor) detecting the acceleration, angular acceleration, angular velocity or the like of the device main body, the center of the lens is shifted along a direction orthogonal to the optical axis on the basis of an output signal from the sensor, and by correcting the offset of the optical axis by changing the inclination of the incident light within the lens, the effects of shaking which appear on the image pickup element due to camera shaking are compensated (offset).

An optical-type camera shaking correcting mechanism uses a gyro sensor which works semi-independently of a signal processing system, and from output of the gyro sensor which is sampled at an arbitrary period, computes an amount of movement of the image caused by blurring, determines a shift amount of the lens, and controls an actuator so as to thereby shift the optical axis.

At this time, shaking which arises due to rotation of the overall device is detected as a time-series change in the rotational velocity at a predetermined sampling interval by an angle sensor. Because this time-series information is the rotational velocity at each sampling time, correction angle information is obtained by carrying out integration processing using the sampling period as the time unit, by cumulative integration (successive addition).

Further, by sending this integrated value to a driving circuit as information specifying the lens position, the driving circuit moves a predetermined lens on the basis of this integrated value. In this way, shaking of the image of the subject of photographing, which is imaged on the image pickup element, i.e., the generation of changes in the imaging position, is suppressed (see, for example, Japanese Patent Application Laid-Open (JP-A) Nos. 63-8628 and 8-101418).

Because optical-type blurring correction compensates changes in the image angle of the device main body by optical axis rotation, if there is a time delay (time lag) from the detection of the shaking of the main body to the lens control, shaking amount corresponding to that delay time will appear as blurring of the image which is imaged at the image pickup element, and the quality of the photographed image will deteriorate.

Because it is difficult to eliminate the delay time, there have been proposals to make the effects of a delay time substantially not be manifested, by carrying out correction processing using optimal parameters corresponding to the shaking, by judging the shaking frequency and switching parameters which are set for each shaking frequency (see, for example, JP-A No. 6-98246).

Further, there have also been proposals to make blurring not arise in a photographed image by judging a shaking waveform from time-series information, estimating a shaking amount at a prescribed time in the future, and carrying out shaking correction on the basis of the results of estimation (see, for example, JP-A Nos. 5-204013 and 5-204014).

However, in these methods, there is the need to analyze the shaking frequency components, or carry out computation processing by the method of least squares or the like such that the time-series data of the camera shaking vibrations approximates a high-order regression curve line, and judge the main frequency of the shaking. To this end, complicated computation processing utilizing a large amount of data is necessary, and a system having a high computational capacity must be used or a long computing time is required.

This therefore leads to an increase in the size of and an increase in the cost of the pickup device, and substantial elimination of blurring is difficult.

On the other hand, an angular velocity sensor which is used in detecting shaking utilizes a method of sensing the torsional force of the vibrating object. Therefore, the detection sensitivity is low. Accordingly, when the torsional force is extracted as time-series information of the rotational velocity, it must be amplified. Thus, it is easy for fluctuations in output to arise due to affects such as noise or drift of the DC or the like due to the temperature characteristic or the like, and as a result, it is easy for the shaking correcting device to function erroneously.

A general output circuit 202 using angular velocity sensors 200A, 200B is shown in FIG. 19A. An HPF (High-Pass Filter) 206 using a large-capacity capacitor 204 is structured in this output circuit 202. By the HPF 206, the DC components of the angular velocity sensors 200A, 200B are cut-off, and a predetermined bias voltage is applied at an amplifying circuit 208. In this way, signals (a PITCH signal and a YAW signal), in which the occurrence of errors due to drift and the DC component are suppressed, are outputted.

On the other hand, low frequency components of around 1 Hz also are included in the frequency components of the shaking. Therefore, if the DC component removal by the HPF 206 is made to be great, the low frequency camera shaking components are damped, and a sufficient camera shaking correcting effect cannot be obtained.

In order to prevent this, the time constant at the HPF 206 must be made to be long (e.g., greater than or equal to 10 sec), but, by doing this, the effect of reducing the drift deteriorates.

Namely, it is difficult to simultaneously achieve both drift reduction and precise shaking detection of low frequencies at the output circuit of the angular velocity sensor.

As a method of overcoming this problem, drift reduction is aimed for as follows: a reference value which follows fluctuations in input is determined by using a cyclic filter of a long period on the numerical data obtained by A/D converting and sampling the sensor output (the output of the output circuit) with the time constant of the HPF being made to be 10 sec or more, and this reference value is subtracted from the input signal.

FIG. 19B shows the schematic structure of a general cyclic filter 210. In this cyclic filter 210, given that a transfer coefficient of a register 212 is n, an input signal is Sin, and an output signal (reference value) is Sout, the reference value Sout is:

$$Sout = Sin \times (1-n) + Sout \times n$$

and the drift component is extracted as a difference between the reference value Sout and the input signal Sin.

However, drift following which uses such a cyclic filter has a high band pass limiting (LPF) characteristic with respect to the input signal. Therefore, with respect to high-frequency shaking, the correction value is damped. Further, a detection signal in which the high-frequency components are damped has an HPF characteristic in which the higher the frequency, the greater the amplitude, which is opposite of the reference value which is the output of the cyclic filter.

In this way, the level of the correction value obtained by integrating the detection value differs in accordance with the frequency, and the problem arises that an optimal correction level can be obtained only with respect to vibrations of specific frequencies.

SUMMARY OF THE INVENTION

The present invention was developed in view of the aforementioned, and provides a camera shaking correcting method, a camera shaking correcting device, and an image pickup device which can suppress the occurrence of blurring in a photographed image by simple computation processing.

Further, the present invention provides a camera shaking correcting device and an image pickup device in which a substantially uniform characteristic can be obtained regardless of the frequency, and which aim for reliable reduction in drift, and which enable highly-accurate shaking correction.

A first aspect of the present invention provides a method of correcting camera shaking which, in an image pickup device outputting image data corresponding to an image of a subject of photographing which is imaged by a lens on an image pickup element of the device, corrects, by movement of a lens, tilting of an optical axis due to shaking of a housing of the device, the method including: detecting, at a predetermined control time interval, an angular velocity at a time when shaking of the housing arises; on the basis of a time integrated value of the detected angular velocity, setting an amount of movement of the lens which compensates the tilting of the optical axis due to shaking of the housing, the setting including adding an addition value, which is based on a difference between a time integrated value of the current time and a time integrated value of a previous time and on a delay coefficient set from a phase delay and the control time, to the time integrated value of the current time; and moving the lens on the basis of a control value obtained from results of the adding.

In accordance with this invention, the angular velocity due to vibration such as shaking or the like is read at a predetermined control time interval. The control value at the time of moving the lens is computed by using the time integrated value computed by carrying out time integration at each control time.

At this time, the addition value is computed on the basis of the difference between the time integrated value of the current time and the time integrated value of the previous time, and the phase delay and the control time. The control value is computed on the basis of the time integrated value of the current time to which this addition value has been added.

For the addition value at this time, the necessary addition value is determined from the difference in the time integrated values, the delay time and the control time. Therefore, the calculation formulas can be set in advance such that this addition value is obtained.

In this way, the lens can be moved such that the tilting of the optical axis due to vibration of the housing is compensated (offset), without carrying out complex computing processing.

As a device for correcting camera shaking to which the present invention is applied, a second aspect of the present invention provides a device for correcting camera shaking which corrects, by movement of a lens, tilting of an optical axis due to shaking of a housing of an image pickup device which outputs image data corresponding to an image of a subject of photographing which is imaged by a lens on an image pickup element of the image pickup device, the device for correcting camera shaking including: a vibration detecting section detecting shaking of the housing, and outputting a signal corresponding to the shaking; an integration processing section reading a detection signal of the vibration detecting section at a predetermined control time interval, and computing a time integrated value; a computing section storing a time integrated value of the integration processing section, and computing an addition value for the time integrated value, on the basis of a difference between the time integrated value and a time integrated value of a previous time, and a delay coefficient set from a phase delay and the control time; a setting section setting an amount of movement of the lens from the integrated value to which the addition value has been added by the computing section; and a lens driving section moving the optical axis of the lens on the basis of the amount of movement set by the setting section.

As an image pickup device to which the present invention is applied, a third aspect of the present invention provides an image pickup device outputting image data corresponding to an image of a subject of photographing which is imaged by a lens on an image pickup element of the device, the image pickup device including: a vibration detecting section detecting shaking of a housing which houses the lens and the image pickup element, and outputting a signal corresponding to the shaking; an integration processing section reading a detection signal of the vibration detecting section at a predetermined control time interval, and computing a time integrated value; a computing section storing a time integrated value of the integration processing section, and computing an addition value for the time integrated value, on the basis of a difference between the time integrated value and a time integrated value of a previous time, and a delay coefficient set from a phase delay and the control time; a setting section setting an amount of movement of the lens from the integrated value to which the addition value has been added by the computing section; and a lens driving section moving an optical axis of the lens on the basis of the amount of movement set by the setting section.

A fourth aspect of the present invention provides a device for correcting camera shaking provided at an image pickup device which outputs image data corresponding to a photographed image which has passed through a lens housed in a housing of the image pickup device and which is imaged on an image pickup element of the image pickup device, the device for correcting camera shaking including: an angular velocity detecting section detecting an angular velocity due to shaking arisen at the housing; an integration computing section computing an integrated value corresponding to a change in an angle of an optical axis of the lens due to shaking, by time integrating at a predetermined time interval an angular velocity signal outputted from the angular velocity detecting section; a control value setting section which, on the basis of an integrated value outputted from the integration computing section, sets a control value for obtaining a correction angle needed in order to compensate tilting of the optical axis of the lens due to the shaking; a lens driving section which, on the basis of the control value set by the control value setting section, drives the lens so as to tilt the optical axis of the lens; and a filter processing section which extracts a reference value from the angular velocity signal detected by the angular velocity detecting section, and outputs a difference between the detected angular velocity signal and the reference value to the integration computing section as a corrected angular velocity signal, the filter processing section extracting the reference value from an angular velocity signal to which a preset constant value has been added or subtracted on the basis of results of comparison of the reference value and an angular velocity signal inputted from the angular velocity detecting section.

In accordance with the present aspect, an angular velocity signal, which is corrected by subtracting the reference value from the angular velocity signal outputted from the angular velocity detecting section, is outputted. At this time, a constant value is set in advance, and the positive/negative sign of the corrected angular velocity signal is judged. By adding or subtracting the constant value to or from the reference value on the basis of the results of judgment, the reference value is updated.

By using the reference value which has been updated in this way, it is possible to obtain an angular velocity signal in which the DC component has been precisely extracted from the inputted angular velocity signal.

By using this angular velocity signal, appropriate shaking correction is possible, and it is possible to precisely suppress blurring from arising in the photographed image.

In the present aspect, the filter processing section may add the constant value to the angular velocity signal when the level of the angular velocity signal is greater than the level of the reference value, and subtract the constant value from the angular velocity signal when the level of the angular velocity signal is smaller than the level of the reference value.

A fifth aspect of the present invention provides a device for correcting camera shaking provided at an image pickup device which outputs image data corresponding to a photographed image which has passed through a lens housed in a housing of the image pickup device and which is imaged on an image pickup element of the image pickup device, the device for correcting camera shaking including: an angular velocity detecting section detecting an angular velocity due to shaking arisen at the housing; an integration computing section computing an integrated value corresponding to a change in an angle of an optical axis of the lens due to shaking, by time integrating at a predetermined time interval an angular velocity signal outputted from the angular velocity detecting section; a control value setting section which, on the basis of an integrated value outputted from the integration computing section, sets a control value for obtaining a correction angle needed in order to compensate tilting of the optical axis of the lens due to the shaking; a lens driving section which, on the basis of the control value set by the control value setting section, drives the lens so as to tilt the optical axis of the lens; and an integrated value filter processing section which is provided at the control value setting section, and which corrects an integrated value used in setting the control value by adding or subtracting a preset constant value to or from the integrated value in accordance with a positive/negative sign of the integrated value outputted from the integration computing section.

In accordance with the present aspect, when setting the control value used at the lens driving section from the integrated value obtained by integrating the angular velocity signal outputted from the angular velocity detecting section, the reference value is subtracted from the integrated value. At this time, the constant value is set in advance. The positive/negative sign of the integrated value, from which the reference value has been subtracted, is judged. By adding or subtracting the constant value to or from the reference value on the basis of the results of this judgment, the reference value is updated.

By using the reference value which has been updated in this way, it is possible to obtain an integrated value in which the DC component within the angular velocity signal is precisely extracted from the integrated value obtained by the integration processing, and it is possible to prevent the integrated value from converging at a high frequency as well.

Accordingly, appropriate shaking correction based on the results of detection of the angular velocity detecting section is possible, and blurring arising in the photographed image can be precisely suppressed.

In the present aspect, the integrated value filter processing section may subtract the constant value from the integrated value when the integrated value is positive, and may add the constant value to the integrated value when the integrated value is negative.

A sixth aspect of the present invention provides an image pickup device which outputs image data corresponding to a photographed image which has passed through a lens housed in a housing of the device and which is imaged on an image pickup element of the device, the image pickup device including: an angular velocity detecting section detecting an angular velocity due to shaking arisen at the housing; a filter processing section which extracts a reference value from the angular velocity signal detected by the angular velocity detecting section, and outputs a difference between the detected angular velocity signal and the reference value as a corrected angular velocity signal, the filter processing section extracting the reference value from an angular velocity signal to which a preset constant value has been added or subtracted on the basis of results of comparison of the reference value and an angular velocity signal inputted from the angular velocity detecting section; an integration computing section computing an integrated value corresponding to a change in an angle of an optical axis of the lens due to the shaking, by time integrating at a predetermined time interval the angular velocity signal corrected by the filter processing section; a control value setting section which, on the basis of the integrated value outputted from the integration computing section, sets a control value for obtaining a correction angle needed in order to compensate tilting of the optical axis of the lens due to the shaking; and a lens driving section which, on the basis of the control value set by the control value setting section, drives the lens so as to tilt the optical axis of the lens.

A seventh aspect of the present invention provides an image pickup device which outputs image data corresponding to a photographed image which has passed through a lens housed in a housing of the device and which is imaged on an image pickup element of the device, the image pickup device including: an angular velocity detecting section detecting an angular velocity due to shaking arisen at the housing; an integration computing section computing an integrated value corresponding to a change in an angle of an optical axis of the lens due to shaking, by time integrating at a predetermined time interval an angular velocity signal outputted from the angular velocity detecting section; an integrated value filter processing section which corrects the integrated value by adding or subtracting a preset constant value to or from the integrated value, in accordance with a positive/negative sign of the integrated value outputted from the integration computing section; a control value setting section which, on the basis of the integrated value corrected by the integrated value filter processing section, sets a control value for obtaining a correction angle needed in order to compensate tilting of the optical axis of the lens due to the shaking; and a lens driving section which, on the basis of the control value set by the control value setting section, drives the lens so as to tilt the optical axis of the lens.

As described above, in accordance with the present invention, tilting of the optical axis of a lens due to shaking of a housing can be appropriately corrected by a simple computation processing such as four-rule computation or the like. In this way, there is the excellent effect of providing an image pickup device which enables high-quality image photographing without blurring at a low cost.

Further, the drift component can be precisely extracted by simple processing from the angular velocity signal outputted from the angular velocity detecting section, and accurate camera shaking correction is possible.

In this way, there are the excellent effects that blurring and the like are reliably prevented from arising in a photographed image which is photographed by the image pickup device, and a high-quality photographed image can be obtained.

BRIEF DESCRIPTION OF THE DRAWINGS

Embodiments of the present invention will be described in detail based on the following figures, wherein:

FIGS. 12A through 12C are graphs showing results of measurement at a time of using the filter circuit of FIG. 11A;

DETAILED DESCRIPTION OF THE INVENTION

Figure 1:
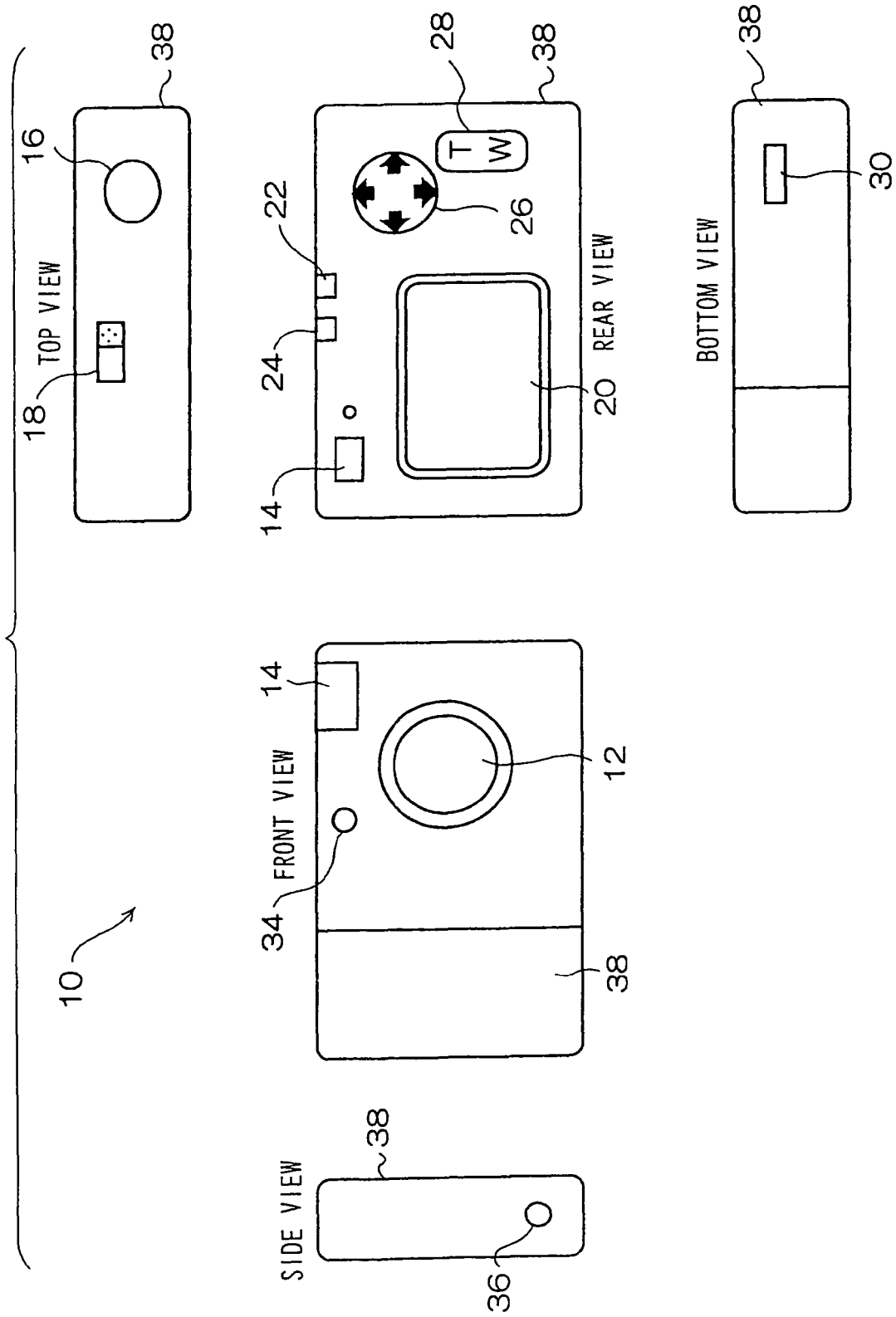
FIG. 1 is a schematic external view of a digital camera applied to embodiments.

Examples of embodiments of the present invention will be described in detail hereinafter with reference to the drawings. FIG. 1 shows the schematic structure of the exterior of a digital still camera (hereinafter called "digital camera") 10 which is applied to the embodiments as an image pickup device.

The digital camera 10 has a lens 12 for imaging an image of a subject of photographing, a finder 14 for deciding upon the composition of the subject to be photographed, a release button (so-called "shutter button") 16 depressed at the time of photographing, a power switch 18, and the like. At the digital camera 10, two stages of the operation of depressing the release button 16 are possible, which are a half-depressed state in which the release button 16 is depressed to an intermediate position, and a fully-depressed state in which the release button 16 is depressed past the intermediate position to a final position.

Provided at the back surface of the digital camera 10 are a liquid crystal display (hereinafter called "LCD") 20 used in displaying the image of the subject of photographing which corresponds to digital image data obtained by photographing, as well as various types of menu screens, messages, and the like; a photographing switch 22 operated at the time of setting a photographing mode and the mode (static image mode or dynamic image mode) at the time of the photographing mode; a playback switch 24 operated at the time of setting a playback mode which displays the photographed image on the LCD 20; a cross cursor button 26 operated when a menu screen is displayed on the LCD 20; a zoom button 28 operated at the time of carrying out zooming (enlargement and reduction) of the image of the subject of photographing at the time of photographing; and the like.

A receptacle 30, which can be connected to an external device by a predetermined interface standard such as USB (Universal Serial Bus) or the like, is provided at the bottom surface of the digital camera 10. Note that a self-timer LED 34, which, by a flashing interval, gives notice of the arrival of the time of photographing when carrying out image photographing by using a self-timer function, and the like may be provided at the digital camera 10. Further, a DC terminal 36, which is for enabling the supply of electric power for operation from the exterior, and the like, may be provided at the digital camera 10.

When the static image mode (static image photographing mode) is set at the digital camera 10, due to the release button 16 being set in the half-depressed state, an AE (Automatic Exposure) function works, and the exposure state, such as the shutter speed, the state of the diaphragm, and the like, is set. Thereafter, an AF (Auto Focus) function works such that the focus is controlled. Moreover, image exposure (image photographing) is carried out by the release button 16 being set in the fully-depressed state in continuation from the half-depressed state.

When the dynamic image mode (dynamic image photographing mode) is set at the digital camera 10, dynamic image photographing is started by the release button 16 being set in the fully-depressed state. After the release button 16 is returned from the fully-depressed state to the half-depressed state, the dynamic image photographing is stopped by the release button 16 again being set in the fully-depressed state. Note that conventionally-known methods can be used for the automatic exposure function and the focus control and the like, and detailed description thereof is omitted in the embodiments. Further, the operations of the image pickup device to which the present invention is applied are not limited to these.

Figure 2:
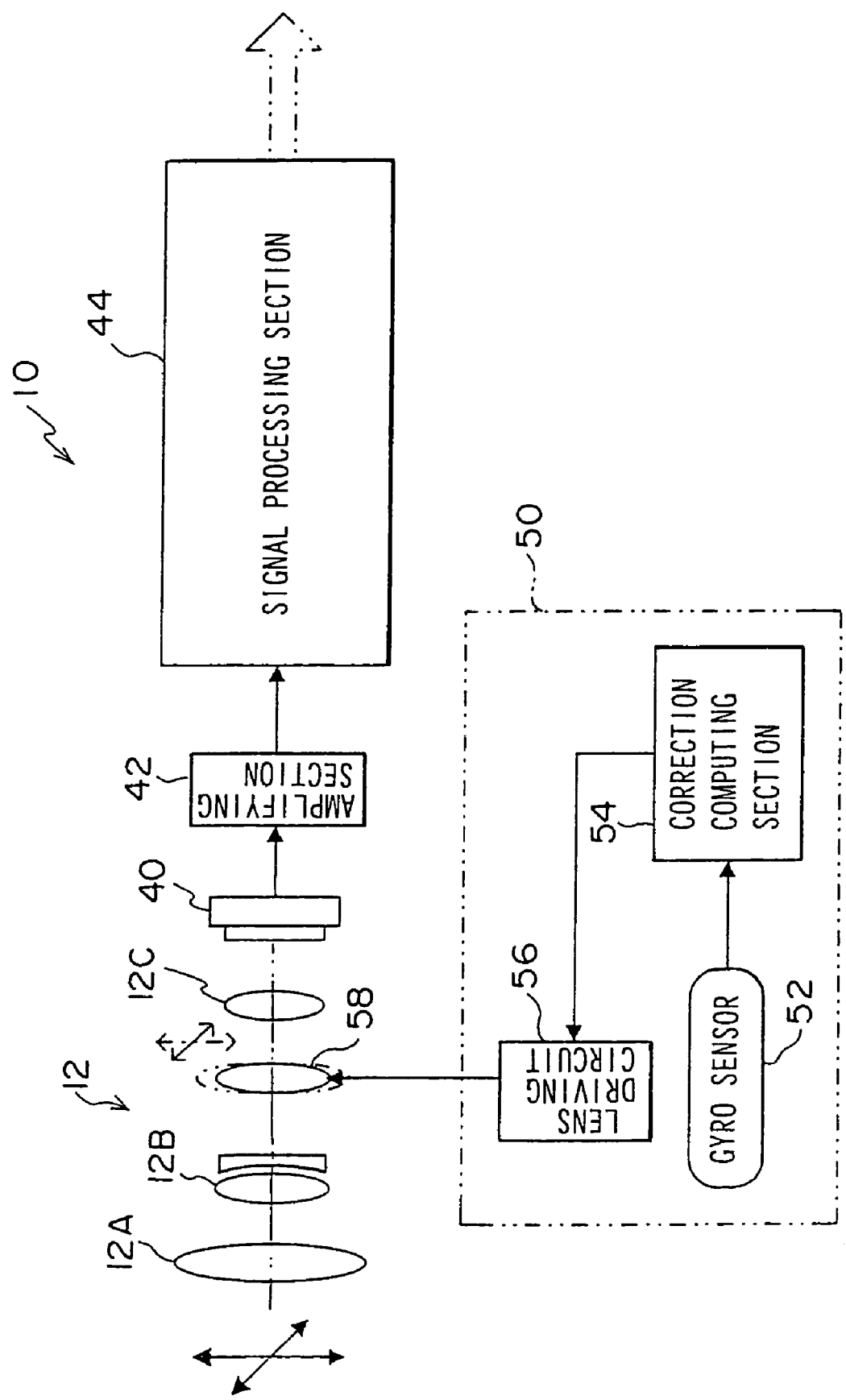
FIG. 2 is a block diagram showing the schematic structure of main portions of the digital camera.

The schematic structure of main portions of the digital camera 10 is shown in FIG. 2. The lens 12, which collects the light from the subject of photographing within a housing 38 (see FIG. 1), and an image pickup element 40, which uses a CCD, a CMOS image sensor or the like, are provided at the digital camera 10.

The lens 12 is formed so as to include, for example, a fixed lens 12A, a zoom lens 12B which changes the magnification, a focus lens 12C which has a function for correcting movement of a focal plane and adjusting the focal point accompanying a change in magnification, and the like. Note that, in FIG. 2, the diaphragm, the shutter, and the like are omitted from illustration.

In accordance with this structure, at the digital camera 10, the image of the subject of photographing is imaged on the image pickup element 40 by the light collected by the fixed lens 12A, and an electric signal (analog image signal) corresponding to the amount of received light of each pixel is outputted from the image pickup element 40.

An amplifying section 42 is provided at the digital camera 10. The amplifying section 42 amplifies the analog signals outputted from the image pickup element 40.

A signal processing section 44 is structured at the digital camera 10 by using an image processing system IC or the like equipped with a microcomputer having a CPU, a ROM, a RAM, a data bus, a system bus, and the like, which are not illustrated.

At the signal processing section 44, due to A/D conversion being carried out on the analog signals inputted from the amplifying section 42, digital image data corresponding to the photographed image (the image of the subject of photographing) is generated. At this time, at the signal processing section 44, the signals of R (red), G (green) and B (blue) are converted into, for example, 12-bit R, G, B signals.

Further, at the signal processing section 44, white balance adjustment is carried out by multiplying the image data, which was generated by the A/D conversion, by a digital gain corresponding to the type of the light source. Further, γ processing, sharpness processing, and the like are carried out, so as to generate, for example, 8-bit image data. Moreover, at the signal processing section 44, YC signal processing is carried out on the image data so as to generate a luminance signal Y and chroma signals Cr, Cb (YC signals).

The YC signals are stored in an image buffer (not shown), and can be used when an image is displayed on the LCD 20. In this way, a through-image can be displayed on the LCD 20.

Here, when static image photographing mode is set and the release button 16 is depressed (fully depressed), the YC signals are compressed in a predetermined compression format such as JPEG or the like at the signal processing section 44, and outputted as an image file of the photographed image.

The image file outputted from the signal processing section 44 is recorded on a recording medium (e.g., a SmartMedia, IC card, CD-R, CD-RW, or the like) loaded in the digital camera 10. Further, the image files outputted from the signal processing section 44, and image files recorded on the recording medium, can be outputted via the receptacle 30 to a personal computer (PC), a TV, or the like.

When dynamic image photographing mode is set, due to the release button 16 being fully depressed, dynamic image photographing is started. After the release button 16 is returned to its half-depressed state, during the period of time until it is fully depressed, i.e., during the period of time in which photographing of the dynamic image is carried out, the YC signals stored in the unillustrated image buffer are compressed in a predetermined format (e.g., Motion JPEG or the like) in each predetermined time (e.g., a time which is set in advance such as each 1/30 second or the like), and outputted as an image file of a dynamic image.

In the digital camera 10 which is structured in this way, due to the power switch 18 being turned on and the photographing switch 22 being operated, the subject is imaged on the image pickup element 40 by the lens 12.

The image pickup element 40 outputs data corresponding to the image of the subject of photographing which has been imaged. This data is subjected to amplification processing, and thereafter, is A/D converted, and the data is thereby read by the signal processing section 44 as image data.

At the signal processing section 44, by subjecting this image data to predetermined processings, the image data can be displayed on the LCD 20. Further, by operating the release button 16 and carrying out image photographing, the image file of the photographed image is outputted from the signal processing section 44.

At the digital camera 10, when vibrations arise at the housing 38 due to camera shaking or the like, tilting arises at the optical axis of the lens 12 with respect to the subject of photographing, and offset arises in the position of the subject of photographing which is imaged on the image pickup element 40. Such offset becomes blurring of the photographed image, and deterioration of the quality of the photographed image arises.

In order to prevent such blurring of the photographed image, the digital camera 10 is equipped with a shaking correcting function which carries out camera shaking correction by an optical method. Here, the shaking correcting function provided at the digital camera 10 will be described as an embodiment of the present invention.

As shown in FIG. 2, a shaking correcting module 50, which carries out camera shaking correction by an optical method, is provided at the digital camera 10. The shaking correcting module 50 has a gyro sensor 52 (shaking detecting means) which is provided as an angular velocity detecting section which detects angular velocity at the time when the housing 38 (see FIG. 1) shakes.

A correction computing section 54 and a lens driving circuit 56 are provided at the shaking correcting module 50. A shift lens 58 is provided at the lens 12. The shift lens 58 is shifted by the lens driving circuit 56 in two directions which are orthogonal to the optical axis of the lens 12 (e.g., when the optical axis is horizontal, the two directions are the vertical direction and the horizontal direction which is orthogonal to both the vertical direction and the optical axis, and hereinafter, in order to simplify explanation, the vertical direction and horizontal direction are referred as to these two directions).

First Embodiment

Figure 3:
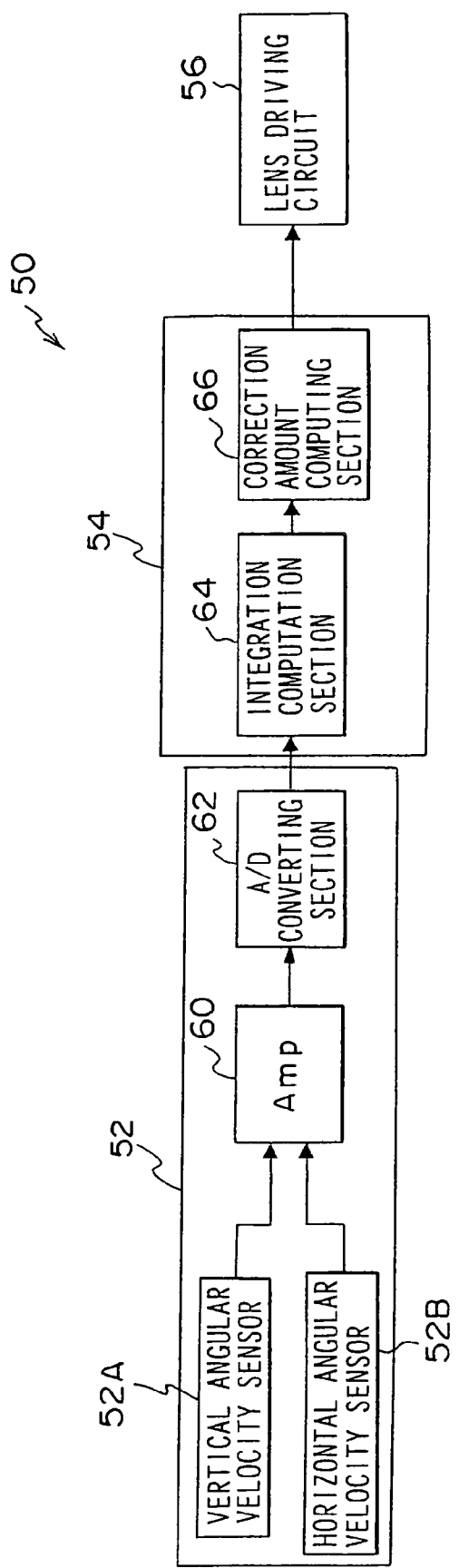
FIG. 3 is a block diagram showing the schematic structure of a shaking correcting module applied to a first embodiment.

As shown in FIG. 3, the gyro sensor 52 has a vertical angular velocity sensor 52A and a horizontal angular velocity sensor 52B. The vertical angular velocity sensor 52A and the horizontal angular velocity sensor 52B detect the angular velocity in the vertical direction and the angular velocity in the horizontal direction of the digital camera 10, and output signals corresponding to the detected angular velocities. Note that, instead of the angular velocity sensors, acceleration sensors or angular acceleration sensors or the like may be used.

The outputs of the gyro sensor 52 are inputted to the correction computing section 54 via an amplifying circuit (Amp) 60 and an A/D converter 62. The correction computing section 54 has a microcomputer (not shown), and an integration computing section 64 (integration processing section) and a correction amount computing section 66 are formed thereby.

Due to the lens driving circuit 56 driving an actuator (not illustrated) on the basis of a blurring correction amount outputted from the correction amount computing section 66, the shift lens 58 moves in the vertical direction and the horizontal direction.

Due to the shift lens 58 being shifted, the optical axis of the lens 12 of the digital camera 10 is tilted in the vertical direction and the horizontal direction. In this way, the position of the image of the subject of photographing which is imaged on the image pickup element 40 is shifted.

After the shaking correcting module 50 amplifies the output signals (angular velocity signals) of the vertical angular velocity sensor 52A and the horizontal angular velocity sensor 52B, the shaking correcting module 50 converts the signals into digital data, and inputs the digital data to the integration computing section 64. At the integration computing section 64, due to the output signals of the vertical angular velocity sensor 52A and the horizontal angular velocity sensor 52B being time integrated, the angular velocity, which is the integrated value of the vertical direction and horizontal direction angle changes per predetermined time period, is computed. Note that, at the shaking correcting module 50, before the A/D conversion is carried out, the DC components are removed by carrying out band limiting by using an unillustrated HPF (High-Pass Filter) or the like.

At the correction amount computing section 66, a control value, which is a correction amount for moving the shift lens 58, is computed on the basis of the results of integration (the integrated value of the angular velocity) and is outputted.

The shaking correcting module 50 moves the shift lens 58 in accordance with this control value, and compensates the tilting of the optical axis of the lens 12 due to the camera shaking.

Namely, due to camera shaking arising, the optical axis of the lens 12 tilts with respect to the subject of photographing. The position of the image of the subject of photographing, which is imaged on the image pickup element 40, thereby changes.

At the shaking correcting module 50, the tilting due to the camera shaking is detected by the gyro sensor 52 (the vertical angular velocity sensor 52A and the horizontal angular velocity sensor 52B). By moving the shift lens 58 in accordance with the detected tilting, the tilting of the optical axis of the lens 12 with respect to the subject of photographing is compensated, and no substantial offset arises in the position of the image of the subject of photographing which is imaged on the image pickup element 40.

On the other hand, when vibration due to camera shaking arises at the housing 38, the gyro sensor 52 outputs signals corresponding to the direction of the vibration and the magnitude of the vibration. Further, after the shaking correcting module 50 carries out integration processing on the output signals of the gyro sensor 52, the shaking correcting module 50 computes a control value on the basis of the results of integration. The shaking correcting module 50 outputs the computed control value to the lens driving circuit 56 as the correction amount. On the basis of this control value, the lens driving circuit 56 drives an actuator (not shown), and thereby moves the shift lens 58.

The above respective processings require no small amount of time, and this time will become the phase delay with respect to the shaking (vibration) of the housing.

Figure 4:
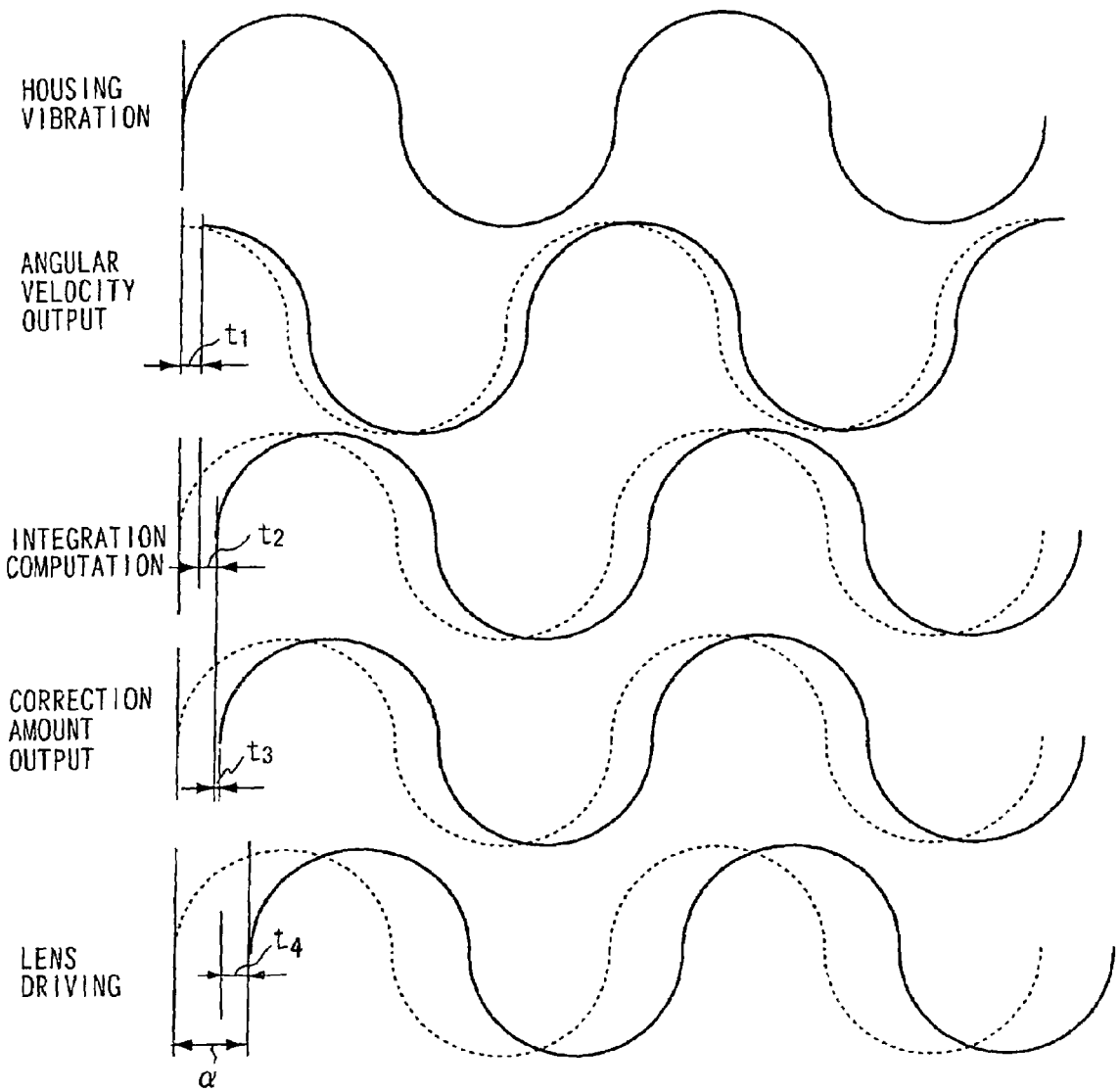
FIG. 4 is a graph showing an outline of the times of changes in angular velocity output, integrated value output, correction amount output, and lens driving, with respect to vibration of a housing.

Namely, as shown by the solid lines in FIG. 4, with respect to the shaking (the vibration of the housing), in addition to a time (time $t_1$) until the signal detection output (angular velocity output) from the gyro sensor 52, a time (time $t_2$) of integration processing (time integration) which uses the detected angular velocity and is carried out at the integration computing section 64, and a time (time $t_3$) needed for computation and output of the correction amount (control value) based on the integration results which is carried out at the correction amount computing section 66, there are added a circuit delay (time $t_4$) spent at the time until the shift lens 58 is actually driven on the basis of the control value, and the like, and a phase lag thereby exists. Such a phase lag (delay time α) can be determined in advance for each digital camera 10.

Thus, the correction amount computing section 66 computes the control value while taking the phase lag (delay time α) into consideration. Specifically, the shaking correcting module 50 outputs the control value at a time (control time ts) interval (control cycle) which is set in advance. At the correction amount computing section 66, the integrated value of the previous time is stored, and the amount of change in the integrated value per unit time is computed from the control time and the difference in the integrated value of the previous time and the integrated value of the current time. By using this amount of change, the control time ts and the delay time (phase lag) α, an addition value with respect to the integrated value is computed. By adding the computed addition value to the integrated value of the current time, a control value which is accelerated by an amount corresponding to the phase lag can be obtained.

Namely, given that the delay time at the shaking correcting module 50, which is the phase lag arising at the shaking correcting module 50, is delay time α (sec), the control time is ts (sec), the integrated value of the current time which is integrated at the integration computing section 64 is $I_{(n)}$, and the integrated value of the previous time is $I_{(n-1)}$, an amount of change $\Delta\beta$ of the integrated value is $$\Delta\beta = I_{(n)} - I_{(n-1)}$$

From this, in consideration of the phase lag (delay time α) per control time ts, an integrated value $Is_{(n)}$, which is used in computing an actual control value $C_{(n)}$, is computed.

$$Is_{(n)} = \Delta\beta_{(n)} \times (\alpha - ts)/ts + I_{(n)}$$

Namely, by carrying out differentiation processing in consideration of the phase lag and the amount of change in the integrated value, the control value $C_{(n)}$ at the time of driving the shift lens 56 can be set by using the integrated value $Is_{(n)}$ which is obtained by accelerating the integrated value $I_{(n)}$. At this time, the coefficient (delay coefficient) is set on the basis of the delay time α and the control time ts.

In this way, as shown by the dashed lines in FIG. 4, at the shaking correcting module 50 provided at the digital camera 10, no phase lag arises in the corrected output with respect to at least the vibration of the housing, and by using this corrected output (the control value $C_{(n)}$), the phase lag can be reliably suppressed.

Figure 5:
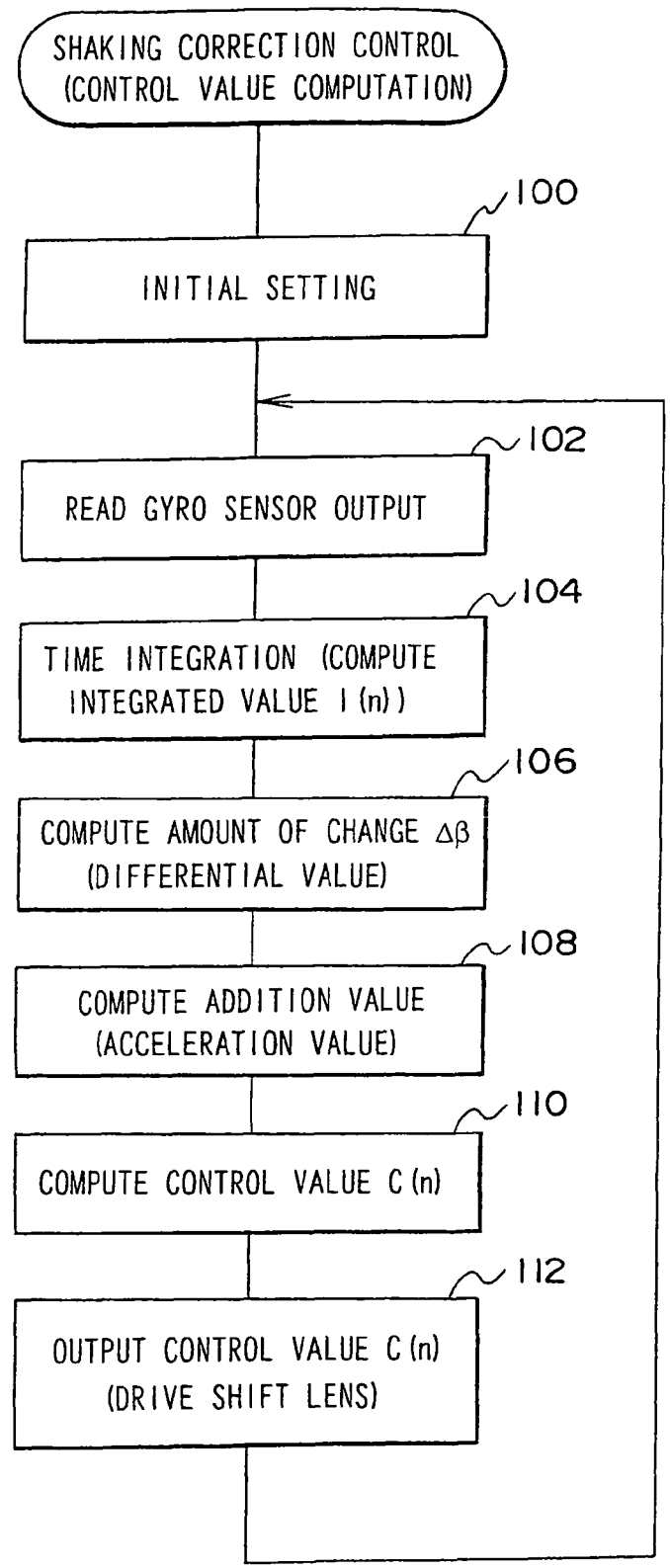
FIG. 5 is a flowchart showing an outline of computation processing of a shaking correcting amount (control value)

Here, the flow of processings at the shaking correcting module 50 will be described with reference to FIG. 5. This flowchart is executed, for example, due to the power switch 18 being turned on, and the photographing switch 22 being operated, and a photographing mode such as static image mode or dynamic image mode or the like being set. In first step 100, initial setting, such as the resetting of an initial value at the time of carrying out time integration of the angular velocity, or the like is carried out.

Note that, at the integration computing section 64, the time integrated value (integrated value) of the angular velocity is stored in an unillustrated memory, and is used in computing the control value at the time of carrying out the next shaking correction. Further, this flowchart ends due to the power source switch 18 being turned off, or due to the mode being switched to the playback mode by operation of the playback switch 24.

When the initial setting is completed, at the interval of the control time ts which is set in advance, the processings from step 102 on are carried out, and the shaking correction processing based on the vibration of the housing 38, such as camera shaking or the like, is executed.

In step 102, the output signals from the gyro sensor 52 are read out. Due to movement such as shaking or the like arising at the housing 38 of the digital camera 10, the gyro sensor 52 outputs signals corresponding to the vertical direction and the horizontal direction angular velocities thereof.

In next step 104, the integrated value $I_{(n)}$ is computed by carrying out time integration with respect to the detected signals of the gyro sensor 52. In step 106, the amount of change $\Delta\beta$ of the integrated value is computed. Namely, by subtracting the integrated value $I_{(n-1)}$ of the previous time from the integrated value $I_{(n)}$, the amount of change $\Delta\beta$ in the angular velocity during the control time ts is computed. This amount of change $\Delta\beta$ is a differential value.

Thereafter, in step 108, the addition value with respect to the integrated value $I_{(n)}$ is computed from the differential value (the amount of change $\Delta\beta$) and the delay coefficient which is determined by the delay time α and the control time ts. By adding the computed addition value to the integrated value $I_{(n)}$, the control value $C_{(n)}$ is computed (step 110).

Due to the control value $C_{(n)}$, which is computed in this way, being outputted to the lens driving circuit 56 (step 112), shaking correction based on the control value $C_{(n)}$ is carried out. Note that if no shaking arises, the control value $C_{(n)}$ is zero, and therefore, driving of the shift lens 58 is stopped.

Figure 6:
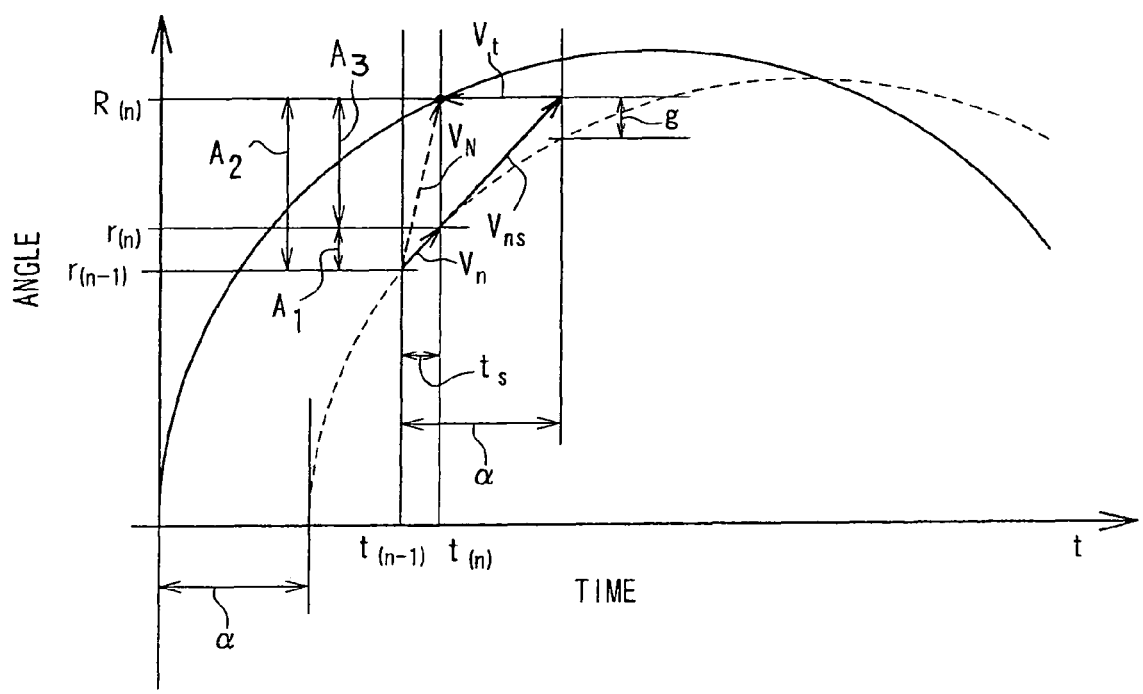
FIG. 6 is a schematic diagram showing changes in an optical axis due to shaking, and changes in an optical axis due to shaking correction.

In FIG. 6, an example of angular displacement of the optical axis of the lens 12 due to vibration (shaking) of the housing 38 is shown by the solid line. Here, when the phase lag α arises, with respect to this shaking, a control value is computed by carrying out only integration processing on the basis of the outputs of the gyro sensor 52. The angular displacement of the optical axis, at the time of shifting the shift lens 58 on the basis of this computed control value, is shown by the dashed line. Note that FIG. 6 illustrates, as an example, a case in which the phase lag α is greater than the control time ts (ts<α).

Angles $r_{(n)}$, $r_{(n-1)}$ are the angles of the optical axis of the lens 12 at the time of driving the shift lens 58 based on the control values $C_{(n)}$, $C_{(n-1)}$ which are computed from the integrated value $I_{(n)}$ and the integrated value $I_{(n-1)}$, respectively. Note that the actual angular displacement of the optical axis due to the movement of the shift lens 58 is the opposite phase of the angular displacement of the optical axis due to shaking, but here, they are illustrated as the same phase.

Here, $V_n$ is the displacement amount of the angle based on the results of detection of the gyro sensor 52 during the period (the control time ts) from time $t_{(n-1)}$ to time $t_{(n)}$ and is computed as a correction differential value. Further, $V_{ns}$ is the displacement amount at the time when it is assumed that the angular velocity at this time is continuous for a time period corresponding to the phase lag α. Here, g is the error (error g) which arises because the actual vibration is not rectilinear.

Namely, the correction value in computation at time $t_{(n)}$ is angle $r_{(n)}$ which is equal to the integrated value $I_{(n)}$, but the actual displacement angle (angular displacement) of the housing 38 is $R_{(n)}$ on the solid line without the phase delay α. Accordingly, by making the angular displacement $R_{(n)}$, which is to be reached after time α at the angular velocity of the displacement amount $V_n$, be the control value at time $t_{(n)}$, the output of the control value is accelerated by time displacement amount $V_t = (\alpha - ts)$.

In this way, by using the dashed-line curve, which is the control values in computation, as a starting point, a displacement amount $V_N$ which is the acceleration vector is added at each control time (each control time ts), and the solid-line curve, which is the actual displacement angles (angular displacement) of the housing 38, is determined approximately.

Given that the displacement amount of the angle based on the displacement amount $V_n$ is angular displacement amount $A_1$, and that the displacement amount of the angle based on the displacement amount $V_{ns}$ (displacement amount $V_N$) is angular displacement amount $A_2$, an angular displacement amount $A_3$, which is the displacement amount of the angle needed in order to conform to the angle corresponding to the actual vibration at time $t_{(n)}$, is:

$$A_3 = A_2 - A_1$$

Namely, the angular displacement amount $A_1$ is the angular displacement of the optical axis based on the integrated values $I_{(n)}$, $I_{(n-1)}$, the angular displacement amount $A_2$ is the angular displacement needed in order to make the angle of the optical axis appropriate during the time period from time $t_{(n-1)}$ to time $t_{(n)}$, and the angular displacement amount $A_3$ is the angular displacement needed in order to make the angle of the optical axis appropriate based on the control value computed from the integrated value $I_{(n)}$.

On the other hand, at the shaking correcting module 50, the amount of change $\Delta\beta$ is computed from the integrated value $I_{(n)}$ of the current time and the integrated value $I_{(n-1)}$ of the previous time. By multiplying ($\alpha$/ts) which is the delay coefficient by this amount of change, an addition value A is computed.

When the time becomes time $t_{(n)}$ from time $t_{(n-1)}$, in order to carry out precise shaking correction, the optical axis of the lens 12 must become angle $R_{(n)}$ by moving the shift lens 58.

From this, it suffices for an integrated value $Is_{(n)}$, by which it is possible to obtain the control value $C_{(n)}$ needed in order to return to the appropriate optical axis by the shift lens 58, to be $$Is(n)=I_{(n-1)}+\Delta\beta\times(\alpha/ts)$$

Namely, it suffices for $$Is_{(n)}=I_{(n)}+\Delta\beta\times(\alpha-ts)/ts$$

Therefore, by adding $$A=\Delta\beta\times(\alpha-ts)/ts$$

as the addition value A to the integrated value $I_{(n)}$, appropriate shaking correction can be carried out regardless of the phase lag $\alpha$ of the shaking correcting module 50. In this way, at the correction amount computing section 66, only simple processings of four-rule computation are added.

Accordingly, at the shaking correcting module 50 which is provided at the digital camera 10, by the simple processings of four-rule computation only, appropriate shaking correction which corresponds to the shaking of the housing 38 can be carried out, and it is possible to reliably prevent blurring from arising in the photographed image due to shaking.

Note that the error g arises between the displacement amount $V_{ns}$ and the angular displacement from time $t_{(n)}$ on which is based on the results of detection of the gyro sensor 52. As mentioned above, this error g arises because the actual angular change is not rectilinear. However, in the shaking correcting module 50, this error g does not appear and is not accumulated in the result of correction. Further, because the control time ts is sufficiently short with respect to the period of the band (the frequency band) of the shaking signal, in the actual driving of the shift lens 58, the error g does not present any problems because it is averaged.

Second Embodiment

Figure 7:
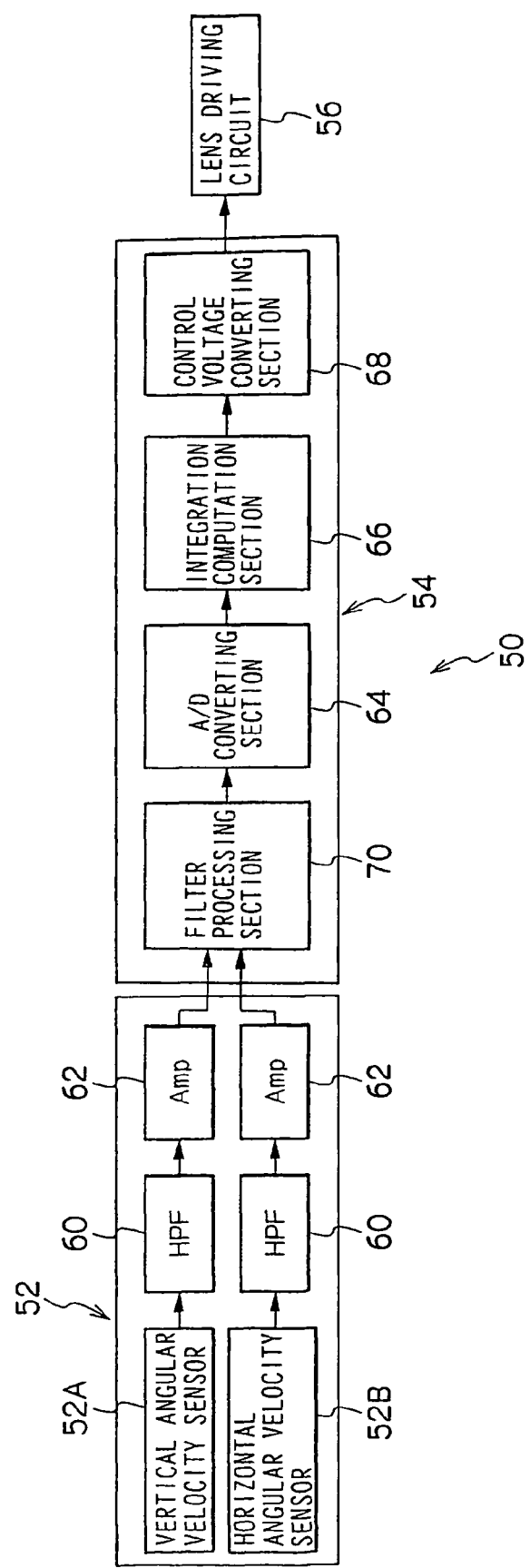
FIG. 7 is a schematic structural diagram of a shaking correcting module applied to a second embodiment.

The schematic structure of main portions of the shaking correcting module 50 relating to a second embodiment are shown in FIG. 7. The gyro sensor 52 has the vertical angular velocity sensor 52A and the horizontal angular velocity sensor 52B. The vertical angular velocity sensor 52A and the horizontal angular velocity sensor 52B detect the angular velocity in the vertical direction and the angular velocity in the horizontal direction of the digital camera 10, and output signals corresponding to the detected angular velocities. Note that, instead of an angular velocity sensor, an acceleration sensor, an angular acceleration sensor, or the like may be used.

HPFs 60, which damp low-band frequency components from the signals outputted from the vertical angular velocity sensor 52A and the horizontal angular velocity sensor 52B respectively, and amplifier circuits (Amp) 62, which amplify the signals which have passed through the HPFs 60, are provided at the gyro sensor 52. In this way, the gyro sensor 52 outputs angular velocity signals with respect to the vertical direction and the horizontal direction, in which the DC components are suppressed. Note that, provided that the gyro sensor 52 can output angular velocity signals corresponding to the detection signals of the angular velocity sensors, the gyro sensor 52 is not limited to this, and an arbitrary structure can be applied thereto.

On the other hand, an A/D converter 64 which converts the angular velocity signals inputted from the gyro sensor 52 into a digital signal, and an integration computation section 66 and a control voltage converting section 68 which are formed by a microcomputer (not shown), are provided at the correction computing section 54.

The integration computation section 66 time integrates the angular velocity signal inputted from the A/D converter 64 at a sampling interval which is set in advance. An integrated value corresponding to the angle of the optical axis is thereby obtained.

The integrated value outputted from the integration computation section 66 is inputted to the control voltage converting section 68. At the control voltage converting section 68, a control voltage (control value) is set on the basis of the integrated value, and the set control value is outputted to the lens driving circuit 56.

The lens driving circuit 56 drives the unillustrated actuator in accordance with this control value, and moves the shift lens 58 in the vertical direction and the horizontal direction.

At the shaking correcting module 50, the tilting of the optical axis of the lens 12, which arises due to the shaking of the housing 38, is compensated by tilting of the optical axis which arises due to the moving of the shift lens 58. In this way, positional offset does not arise in the image of the subject of photographing which is imaged on the image pickup element 40.

On the other hand, the angular velocity signals outputted from the gyro sensor 52 contain a noise component and a DC component. The output signals of the angular velocity sensors 52A, 52B drift greatly due to the DC components in particular, and there are cases in which appropriate correction is difficult due to this drift.

Figures 8A, 8B, 8C:
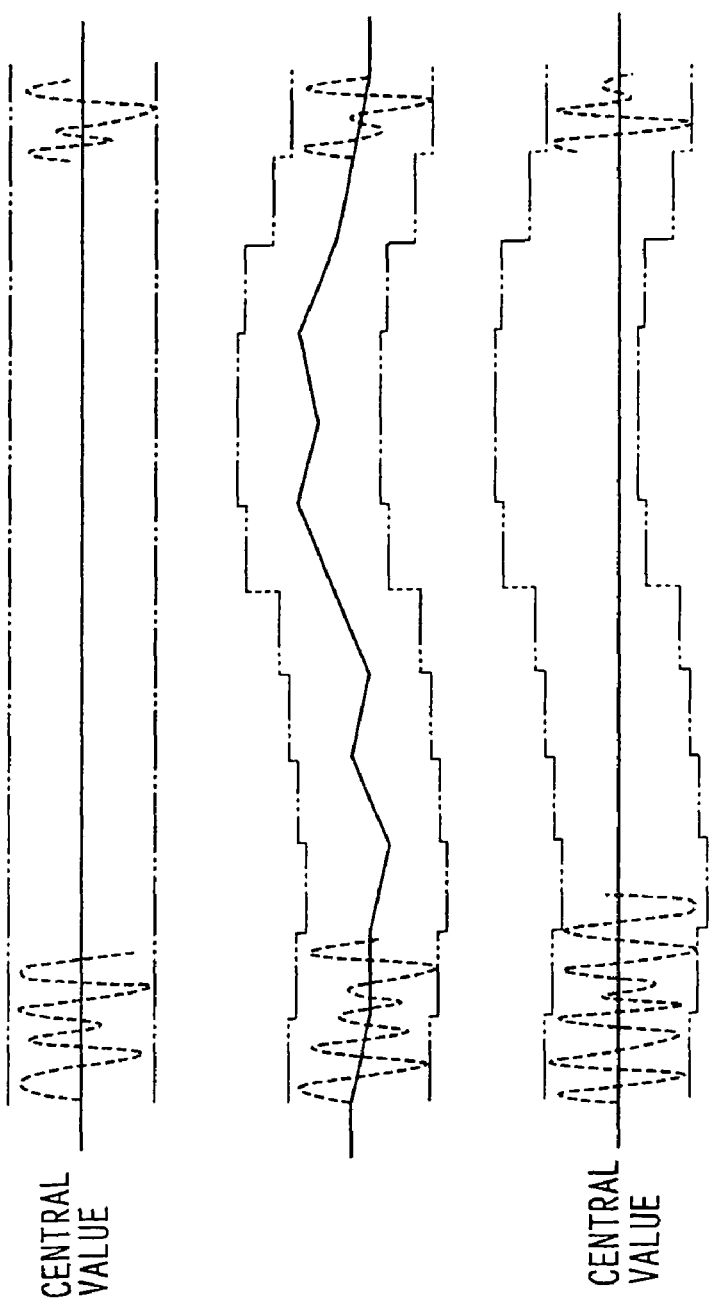
FIG. 8A is graph showing an outline of an amplitude range of an angular velocity signal which does not contain a drift component.
FIG. 8B is a graph showing an outline of an amplitude range of an angular velocity signal which contains a drift component.
FIG. 8C is a graph showing an outline of an amplitude range of an angular velocity signal when a drift component is not considered.

Namely, as shown in FIG. 8A, when no drift arises in the angular velocity signal outputted from the gyro sensor 52, the signal has an amplitude of a predetermined range which is centered around a prescribed central value. (The upper and lower limits of the amplitude of the angular velocity signal are shown by the two-dot chain lines in FIGS. 8A through 8C.)

In contrast, if drift (e.g., the signal shown by the solid line in FIG. 8B) is included in the angular velocity signal outputted from the gyro sensor 52, the range of the amplitude of the angular velocity signal changes. As shown in FIG. 8C, when the angular velocity is integrated by using the fixed central value as a reference, and camera shaking correction is carried out on the basis of the results of integration, a large error arises, and blurring of the photographed image cannot be suppressed.

Figure 9:
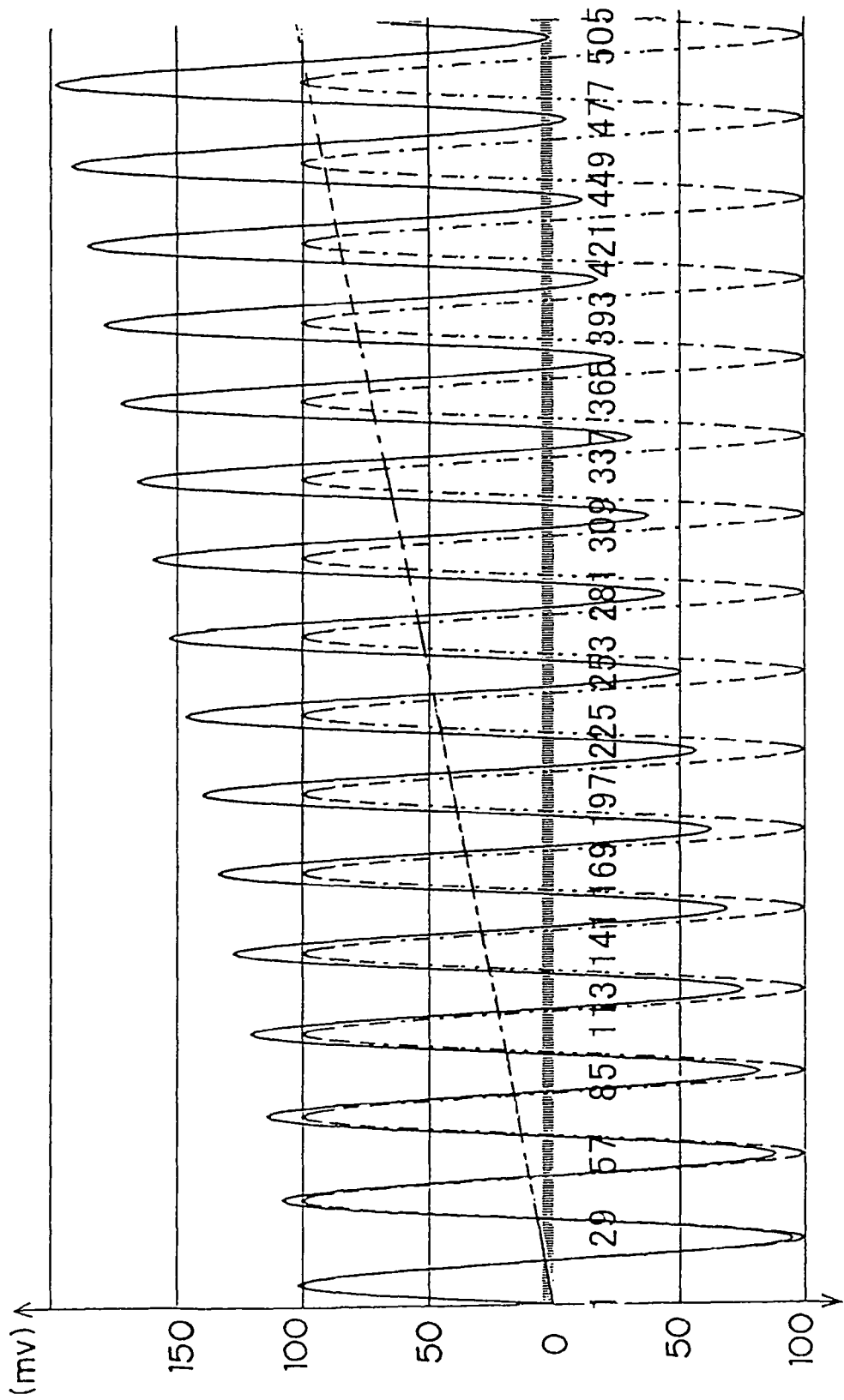
FIG. 9 is a graph showing an outline of a drift component, an angular velocity signal which contains a drift component, and an angular velocity signal which does not contain a drift component.

Namely, as shown in FIG. 9, with respect to the original angular velocity signal (shown by the two-dot chain line in FIG. 9), a drift component (shown by the dashed line in FIG. 9) is contained in the angular velocity signal. Therefore, the angular velocity signal which is outputted from the gyro sensor 52 in actuality differs from the actual angular velocity due to the drift component, as shown by the solid line in FIG. 9.

Accordingly, when camera shaking correction is carried out on the basis of the angular velocity signals outputted from the gyro sensor 52, a large error arises, and there are cases in which the blurring of the photographed image is increased.

In order to prevent such an error from arising, by making the central value (hereinafter called "reference value") follow in accordance with the drift, the angular velocity signal of FIG. 8A can be extracted from the angular velocity signal of FIG. 8B, and appropriate camera shaking correction which corresponds to the output signals of the angular velocity sensors 52A, 52B is possible.

In order to carry this out, as shown in FIG. 7, a filter processing section 70 is provided at the shaking correcting module 50 applied to the second embodiment. This filter processing section 70 may be structured by hardware, or may be structured by software which is executed at an unillustrated microcomputer.

Figure 10A:
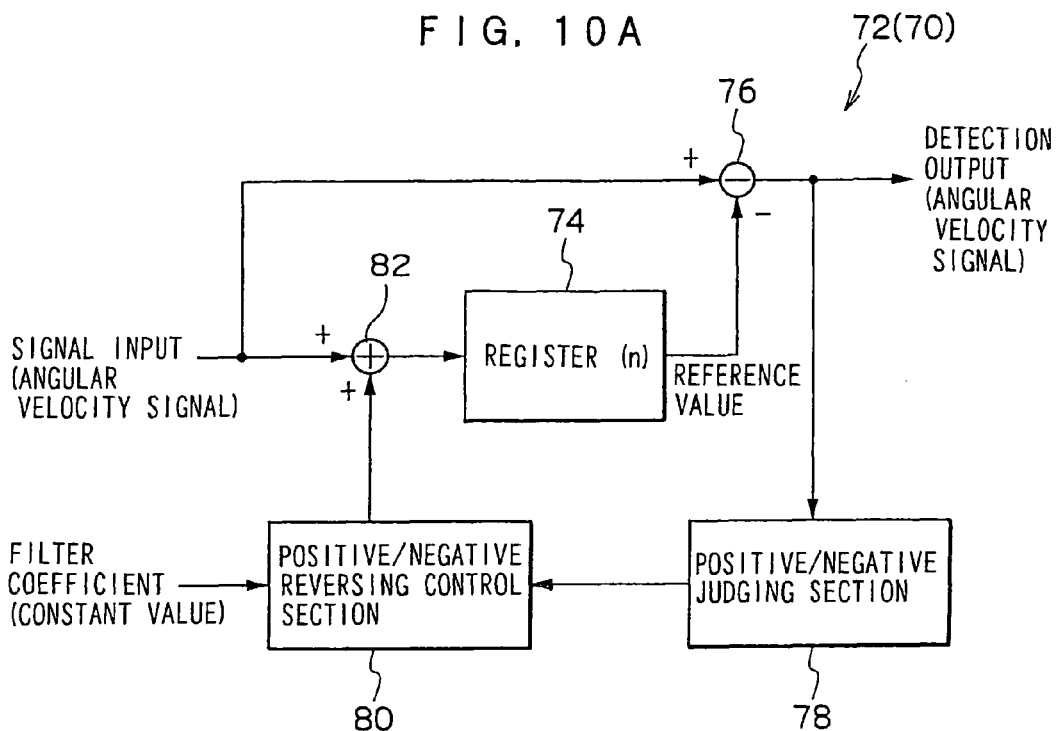
FIG. 10A is a schematic structural diagram of a filter circuit applied to the second embodiment.

FIG. 10A shows a filter circuit 72 which is an example of the filter processing section 70 which is structured by hardware.

A register 74 of a predetermined transfer coefficient n is provided at the filter circuit 72. An angular velocity signal is inputted as an input signal to the register 74. Further, the transfer coefficient n is given in the range 0<n<1.

A subtractor 76 is provided at the filter circuit 72. A difference signal of the output signal of the register 74 from the input signal, is outputted as detected output. At the filter circuit 72, this detected output is to be a corrected angular velocity signal.

The filter circuit 72 has a positive/negative judging section 78, a positive/negative reversing control section 80, and an adder 82. The positive/negative judging section 78 judges whether an output signal (output signal value) outputted from the subtractor 76 is positive or negative, and outputs the results of judgment to the positive/negative reversing control section 80.

A filter coefficient, which is set in advance for each gyro sensor 52, is inputted as a constant value to the positive/negative reversing control section 80. On the basis of the results of judgment of the positive/negative judging section 78, the positive/negative reversing control section 80 reverses the constant value, and outputs it to the adder 82.

Further, an input signal value is inputted to the adder 82, and the constant value is thereby added to the input signal value, and the sum is inputted to the register 74.

At the positive/negative reversing control section 80, due to a signal, which has been judged to be positive at the positive/negative judging section 78 being inputted, the constant value is added to the input signal. When it is judged to be negative, the sign of the constant value is reversed such that the constant value is subtracted from the input signal.

Namely, when the output value of the register 74 (i.e., reference value) is smaller than the input signal value, a signal value, in which the constant value is added to the input signal value, is inputted to the register 74. When the output value of the register 74 is greater than the input signal value, a signal, in which the constant value is subtracted from the input signal value, is inputted to the register 74.

In this way, at the filter circuit 72, the output value of the register 74 is a reference value, and by subtracting the reference value from the input signal value, an angular velocity signal value, on which drift correction has been carried out, is outputted as the output signal value.

Figure 10B:
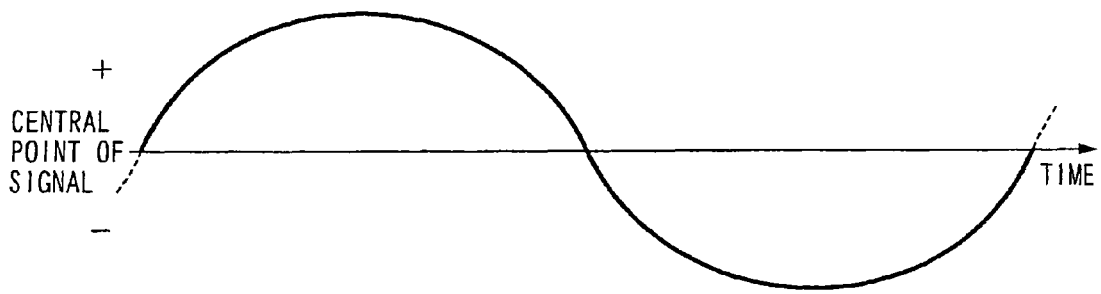
FIG. 10B is a graph showing an example of an input signal.

An example of an input signal inputted to the filter circuit 72 is shown in FIG. 10B. A summary of changes in the reference value with respect to the input signal of FIG. 10B is shown in FIG. 10C.

Figure 10C:
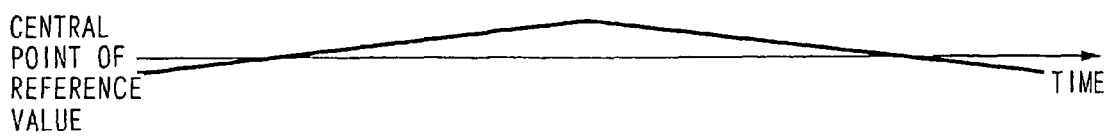
FIG. 10C is a graph showing a summary of changes in a reference value at the filter circuit shown in FIG. 10A at the time of the input signal of FIG. 10B.

As shown in FIGS. 10B and 10C, at the filter circuit 72, if the input signal is larger than the central point of the signal, the reference value is gradually made larger (increased) at a predetermined incline. Further, if the input signal falls below the central point of the signal, the reference value is gradually made smaller (decreased). The reference value at this time varies at an incline which corresponds to a constant value.

The constant value is determined for each digital camera 10 by carrying out testing, so that the drift is eliminated precisely from the angular velocity signals outputted from the gyro sensor 52.

Figure 11A:
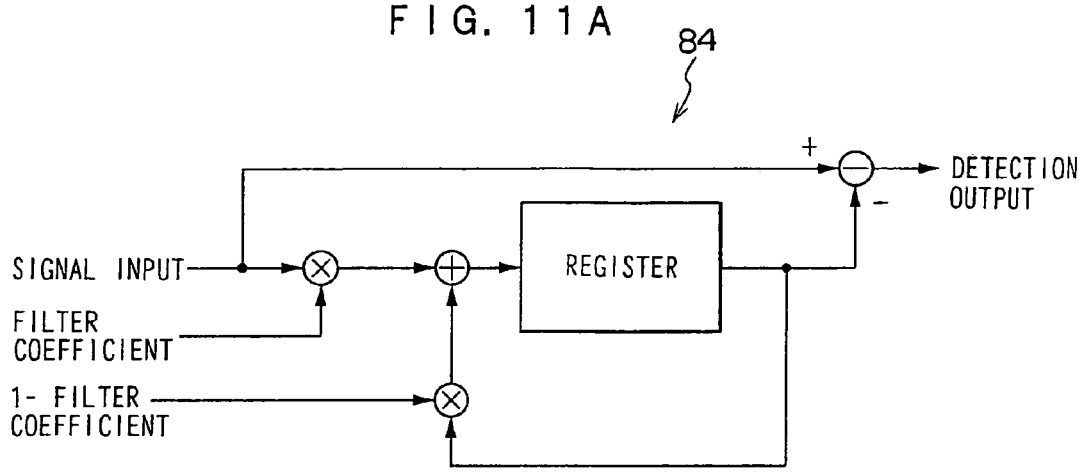
FIG. 11A is a schematic structural diagram of a filter circuit which is a comparative example of FIG. 10A.
Figure 11B:
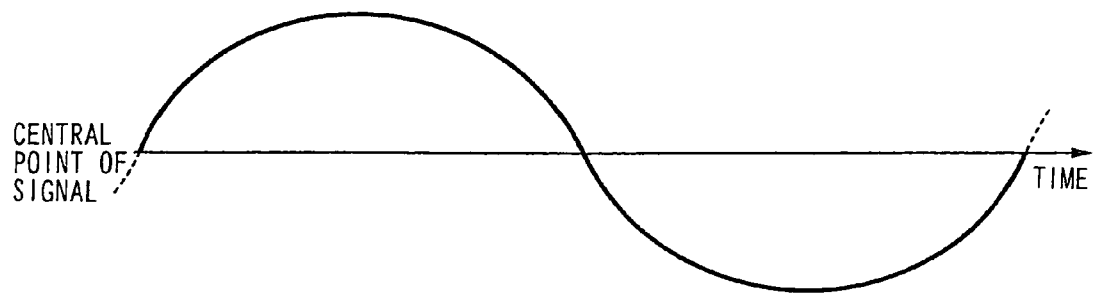
FIG. 11B is a graph showing an example of an input signal.
Figure 11C:
FIG. 11C is a graph showing a summary of changes in a reference value at the filter circuit shown in FIG. 11A at the time of the input signal of FIG. 11B.

A filter circuit 84, which is an example of a filter circuit used in general camera shaking correction, is shown in FIG. 11A. At this filter circuit 84, the reference value is made to follow the input signal value, by using a filter coefficient α which is set in advance and (1−the filter coefficient), and without using results of comparison of the input signal value and the reference value. Further, FIG. 11B shows an example of an input signal which is the same as FIG. 10B. FIG. 11C, which corresponds to FIG. 10C, shows changes in the reference value corresponding to this input signal.

Here, the results of testing using the filter circuit 72 are shown in FIGS. 12A through 12C. As a comparative example, the results of similar testing using the filter circuit 84 are shown in FIGS. 13A through 13C.

Figure 13A:
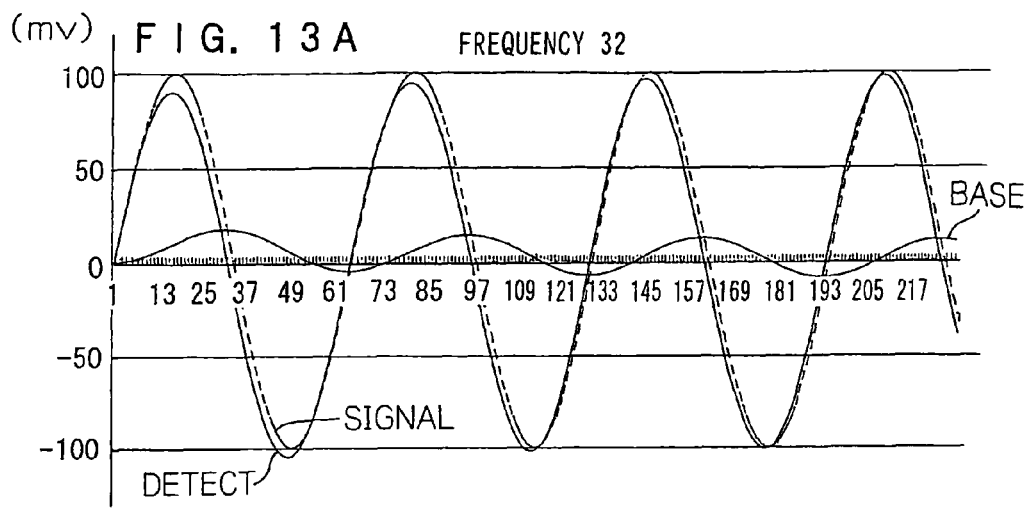
FIGS. 13A through 13C are graphs showing results of measurement at a time of using the filter circuit of FIG. 12A.
Figure 13B:
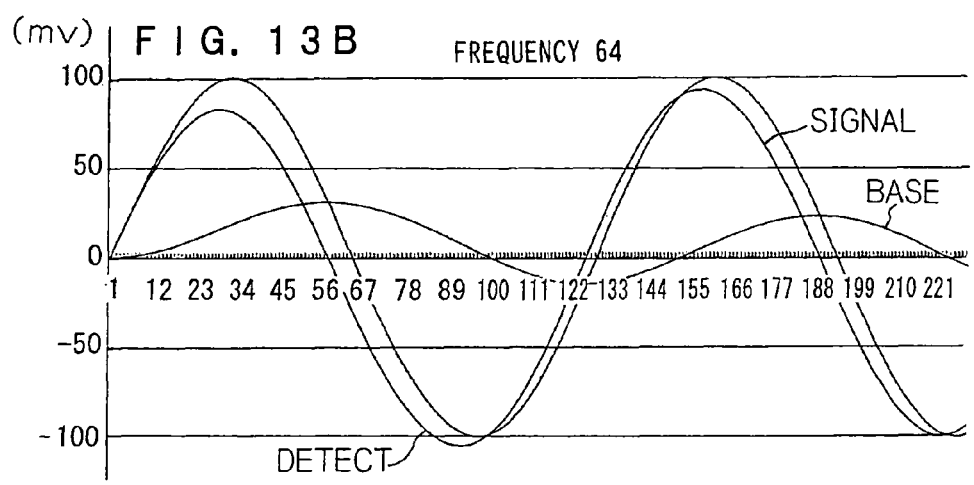
Figure 13C:
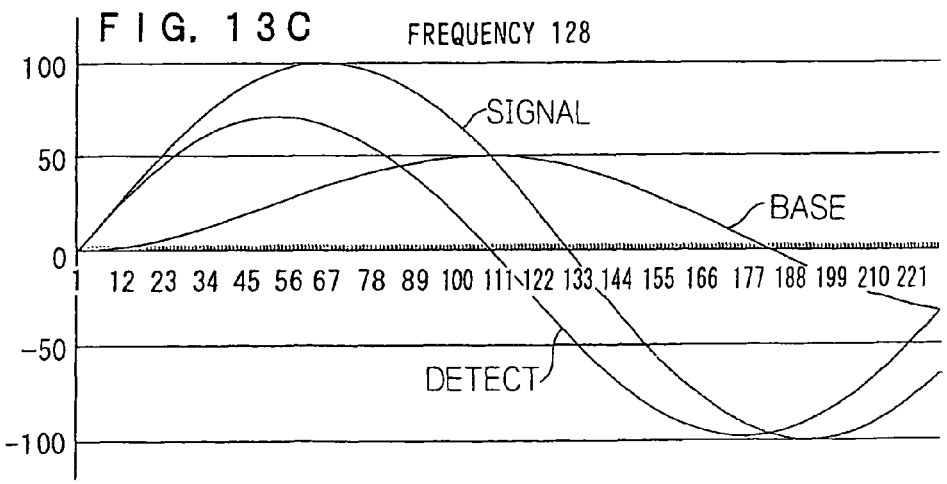

Note that, in FIGS. 12A through 12C and in FIGS. 13A through 13C, the reference value is denoted by BASE, and SIGNAL indicates the input signal, and DETECT indicates the output signal. Time is on the horizontal axis, and voltage is on the vertical axis. Further, in FIGS. 12A and 13A, the period of the input signal is 32 msec, in FIGS. 12B and 13B, the period of the input signal is 64 msec, and in FIGS. 12C and 13C, the period of the input signal is 128 msec.

As shown in FIGS. 13A through 13C, in a case in which the filter circuit 84 is used, the reference value varies periodically in accordance with the input signal, and offset in the phases arises between the input signal and the reference value. Therefore, offset in the phases arises between the input signal and the output signal. In particular, when the frequency is long as shown in FIG. 13C, the offset in the phases also is great.

Namely, in the filter circuit 82, the reference value includes not only a DC component, but also a frequency component corresponding to the period of the input signal. Therefore, when the reference value is extracted from the input signal, the error between the input signal and the output signal is large, and appropriate shaking correction is difficult.

In contrast, as shown in FIGS. 12A through 12C, there is little change in the reference value at the filter circuit 72.

Therefore, when the filter circuit 72 is used, offset in the phases does not arise between the input signal and the output signal. Namely, it is possible to extract only the drift component (the DC component).

Accordingly, it is possible to obtain an output signal in which drift of the input signal due to the drift component is suppressed, and appropriate camera shaking correction can be carried out by removing the drift from the angular velocity signals outputted from the gyro sensor 52.

Further, at the filter circuit 72, this is made possible by the simple structure of merely addition and subtraction of a constant value which is set in advance.

An example using the filter circuit 72 has been described heretofore, but processing in accordance with software can be also applied.

Figure 14:
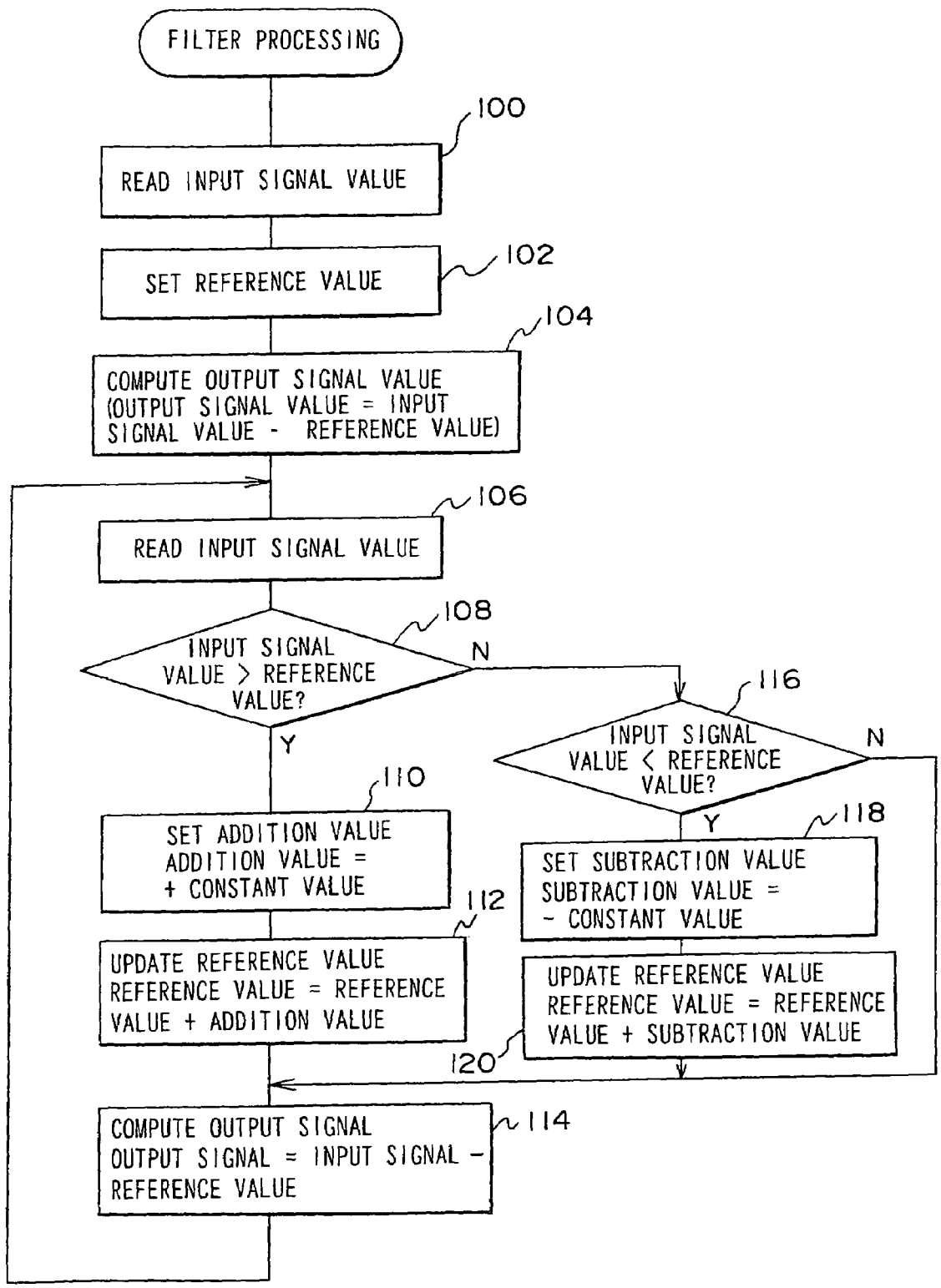
FIG. 14 is a flowchart of processings which can be applied instead of a filter circuit in the second embodiment.

The flow of processings in this case is shown in FIG. 14. This flowchart is executed, for example, at the time when the digital camera 10 is set in the photographing mode, and initial setting is carried out at first.

In this initial setting, in step 100, the angular velocity signal (angular velocity signal value) outputted from the gyro sensor 52 is read-in as an input signal (input signal value). In next step 102, an initial value of the reference value is set from the input signal value which is read-in.

Thereafter, a value, which is obtained by subtracting the reference value from the input signal value, is outputted as an output signal value (output signal) (step 104). Note that this initial setting may be omitted, and a value which is set in advance may be used as the reference value.

When the initial setting is carried out in this way, the steps from step 106 on are repeatedly executed at a predetermined sampling interval (the control time interval of the camera shaking correction). In step 106, the input signal value outputted from the gyro sensor 52 is read. In next step 108, the input signal value is compared with the reference value, and it is judged whether or not the input signal value is greater than the reference value.

Here, if the input signal is greater than the output signal, the determination in step 108 is affirmative, and the routine moves on to step 110 where a constant value which is set in advance is set as an addition value. Next, in step 112, the set addition value is added to the reference value so as to update the reference value.

Thereafter, the routine moves on to step 114 where an output signal value is computed by subtracting the reference value from the input signal value.

Further, if the reference value is larger than the input signal value, the determination in step 108 is negative, and the routine proceeds to step 116. In step 116, it is confirmed whether or not the input signal value is lower than the reference value, and if the determination is affirmative, the routine moves on to step 118.

In step 118, the constant value is set as a subtraction value. In next step 120, by subtracting the constant value from the reference value, the reference value is updated.

Thereafter, the routine proceeds to step 114, where the output signal value is computed from the input signal value and the reference value.

Further, when the input signal value and the reference signal value are the same, the determination in step 116 is negative, and the routine moves on to step 114. In this way, without updating the reference value, computation of the output signal value using this reference value is carried out.

By carrying out these processings, an output signal, in which the drift component is precisely removed from the input signal, can be obtained. By using this output signal as the angular velocity signal detected at the gyro sensor 52, optimal shaking correction utilizing the shift lens 58 can be carried out.

Third Embodiment

A third embodiment of the present invention will be described next. Note that the basic structure of the third embodiment is the same as the above-described second embodiment. In the third embodiment, parts which are the same as in the second embodiment are denoted by the same reference numerals, and description thereof is omitted.

Figure 15:
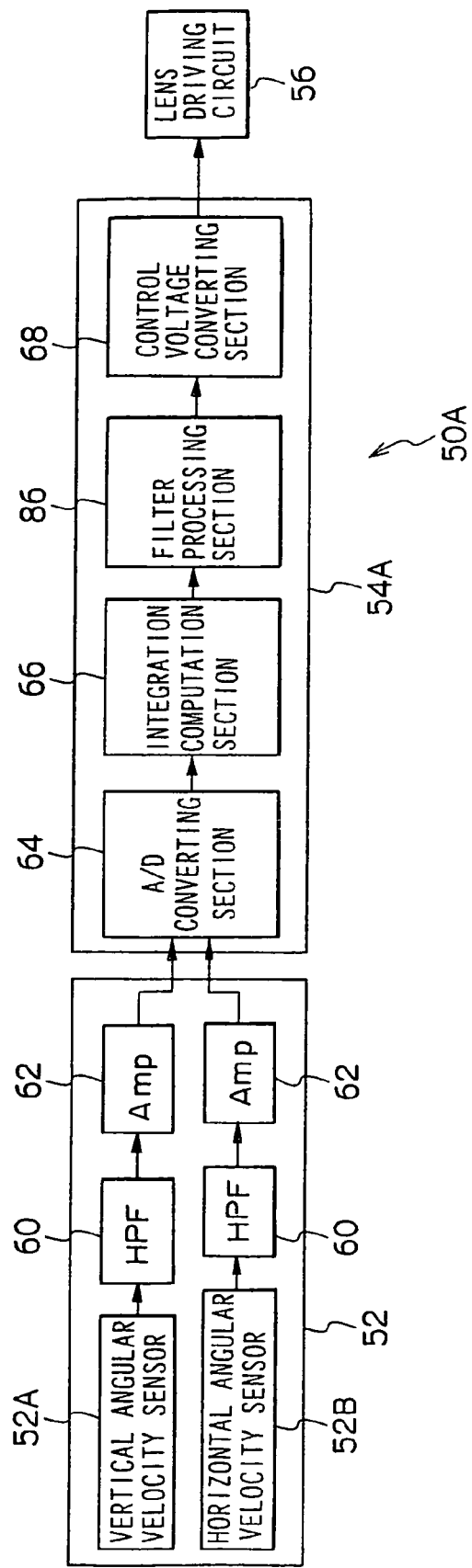
FIG. 15 is a schematic structural diagram of a shaking correcting module applied to a third embodiment.

The schematic structure of a shaking correcting module 50A applied to the third embodiment is shown in FIG. 15.

In addition to the A/D converter 64, the integration processing section 66, and the control voltage converting section 68 at a correction computing section 54A, the shaking correcting module 50A also has a filter processing section 86 between the integration computing section 66 and the control voltage converting section 68.

At the filter processing section 86, the drift component contained in the angular velocity signal is removed from the integrated value which is obtained by integrating the angular velocity signal outputted from the gyro sensor 52. In this way, at the shaking correcting module 50A, it is possible to carry out appropriate shaking correction processing based on an angular velocity signal which does not include a drift component.

Figure 16A:
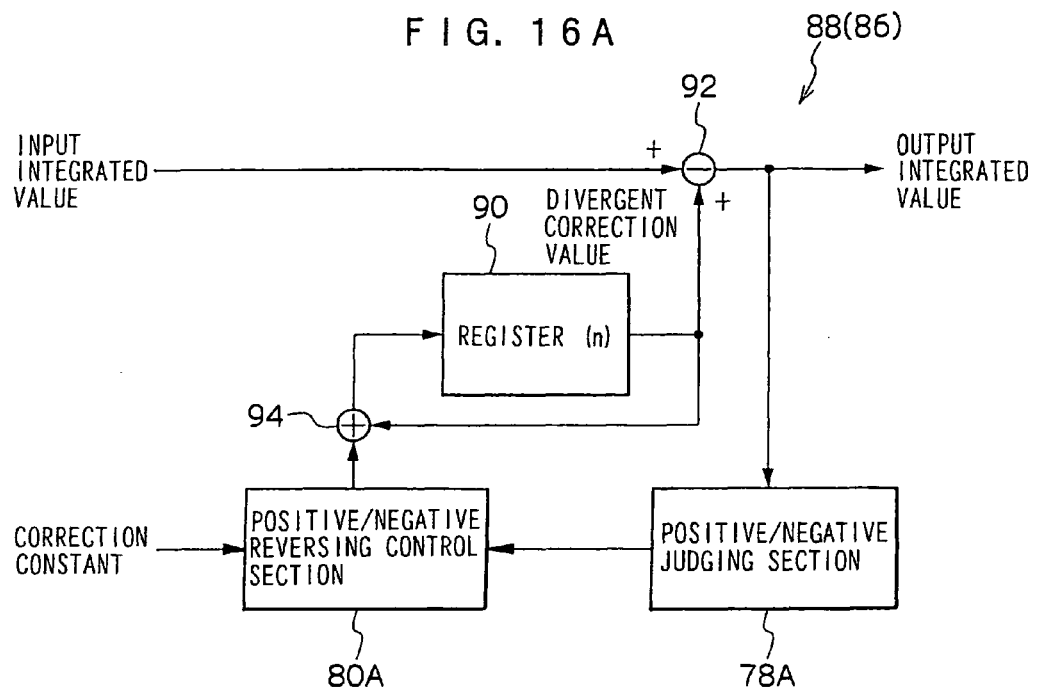
FIG. 16A is a schematic structural diagram of a filter circuit applied to the third embodiment.

A filter circuit 88, which is an example of a filter circuit provided at the filter processing section 86, is shown in FIG. 16A. The filter circuit 88 is structured to include a register 90, a subtractor 92, an adder 94, a positive/negative judging section 78A and a positive/negative reversing control section 80A.

An integrated value (input integrated value), which is an integrated value obtained by carrying out integration processing at the integration processing section 66, is inputted to the filter circuit 88 as an input signal (input signal value). A reference value outputted from the register 90 is subtracted from this integrated value, and an integrated value used in setting the control value (control voltage) for the time of driving shift lens 56 is outputted.

An output signal value (output integrated value) of the subtractor 92 is inputted to the positive/negative judging section 78A. The positive/negative judging section 78A judges the sign of the output integrated value outputted from the filter circuit 88.

On the other hand, a signal corresponding to the results of judgment of the positive/negative judging section 78A, and a constant value (correction constant value) which is set in advance and serves as an addition/subtraction constant used in addition and subtraction, are inputted to the positive/negative reversing control section 80A.

At the positive/negative reversing control section 80A, when the output integrated value outputted from the filter circuit 88 is negative, setting is carried out such that the correction constant value is used as a subtraction constant value. When the output integrated value is positive, setting is carried out such that the correction constant value is used as an addition constant value.

The correction constant, whose positive/negative sign is set at the positive/negative reversing control section 80A, is added to or subtracted from the reference value, and the result is inputted to the register 90. In this way, at the filter circuit 88, the reference value outputted from the register 90 is made t be a divergent correction value (and is hereinafter called "divergent correction value").

For the transfer coefficient n of the register 90 and the correction constant value, measurement of the integrated value outputted from the filter circuit 88 is carried out by carrying out testing or the like in advance, and values which can move the shift lens 58 appropriately with respect to the angular velocity detected by the gyro sensor 52 are set.

At the filter circuit 88, by using this correction constant value, the reference value outputted from the register 90 is the divergent correction value, and it is possible to prevent the integrated value which is outputted from the filter circuit 88 from converging in a high frequency region. Moreover, the drift components, which are included in the angular velocity signals outputted from the gyro sensor 52, do not appear in the integrated value which is used in setting the control value for driving the shift lens 58.

Figure 16B:
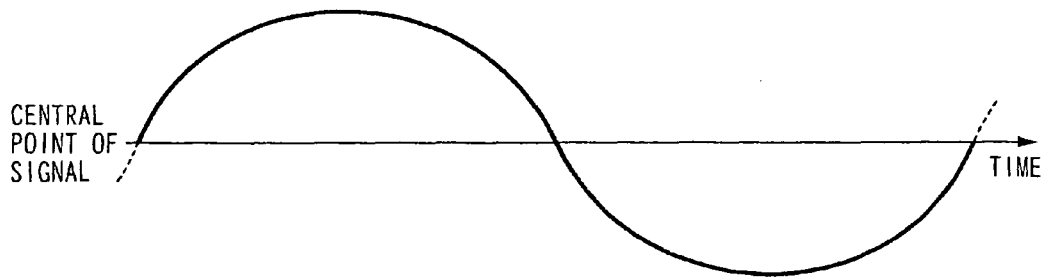
FIG. 16B is a graph showing an example of an input signal.
Figure 16C:
FIG. 16C is a graph showing a summary of changes in a reference value at the filter circuit shown in FIG. 16A at the time of the input signal of FIG. 16B.

FIG. 16B shows an example of an input signal (an example of the variation of the input integrated value) inputted to the filter circuit 88, and FIG. 16C shows a summary of changes in the divergent correction value with respect to the input signal of FIG. 16B.

As shown in FIGS. 16B and 16C, at the filter circuit 88, when the input integrated value which is the input signal is larger than the central point of the signal, the divergent correction value gradually becomes larger (increases) at a predetermined incline. Further, if the input signal falls lower than the central point of the signal, the divergent correction value gradually becomes smaller (decreases). The divergent correction value at this time varies at an incline corresponding to the addition/subtraction constant value (the correction constant).

Figure 17A:
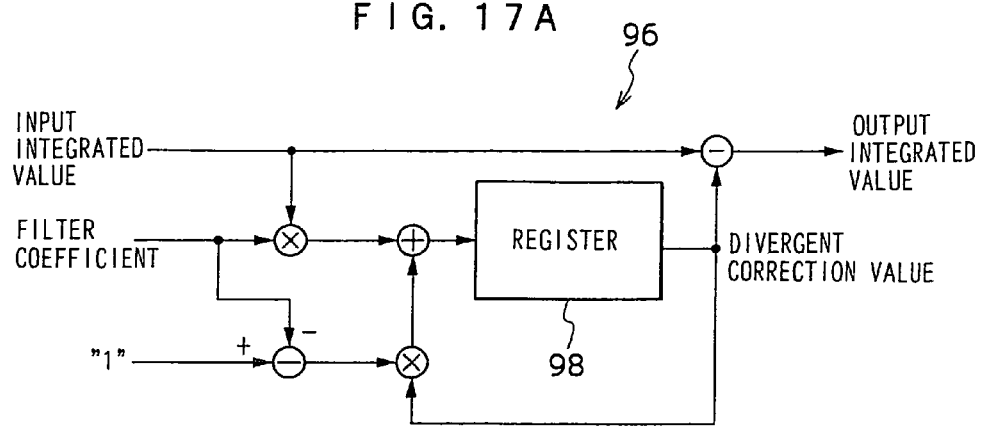
FIG. 17A is a schematic structural diagram of a filter circuit which is a comparative example of FIG. 16A.
Figure 17B:
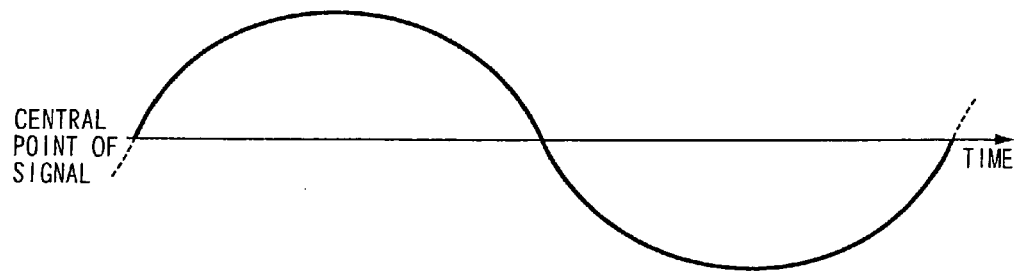
FIG. 17B is a graph showing an example of an input signal.
Figure 17C:
FIG. 17C is a graph showing a summary of changes in a reference value at the filter circuit shown in FIG. 17A at the time of the input signal of FIG. 17B.

A filter circuit 96, which is an example of a filter circuit of a general structure which suppresses divergence in the integrated value at the time of carrying out camera shaking correction, is shown in FIG. 17A. In this filter circuit 96, a divergent correction value is outputted from a register 98 by using a filter coefficient which is set in advance. At this time, at the filter circuit 96, the divergent correction value is made to follow the input signal, without using results of comparison of the input signal and the divergent correction value. Further, an example of an input signal which is the same as FIG. 16B is shown in FIG. 17B. Changes in the reference value (the divergent correction value) with respect to the input signal are shown in FIG. 17C which corresponds to FIG. 16C.

As can be understood by comparing FIGS. 16B, 16C and FIGS. 17B, 17C, when the filter circuit 88 is used, effects which are equivalent to those of the filter circuit 72 which is applied to the previously-described second embodiment can be obtained. Accordingly, also at the shaking correcting module 50A which removes the drift component from the integrated value of the angular velocity signals, appropriate camera shaking correction using the gyro sensor 52 is possible.

Further, at the filter processing section 86 as well, processing by software can be utilized instead of the filter circuit 88.

Figure 18:
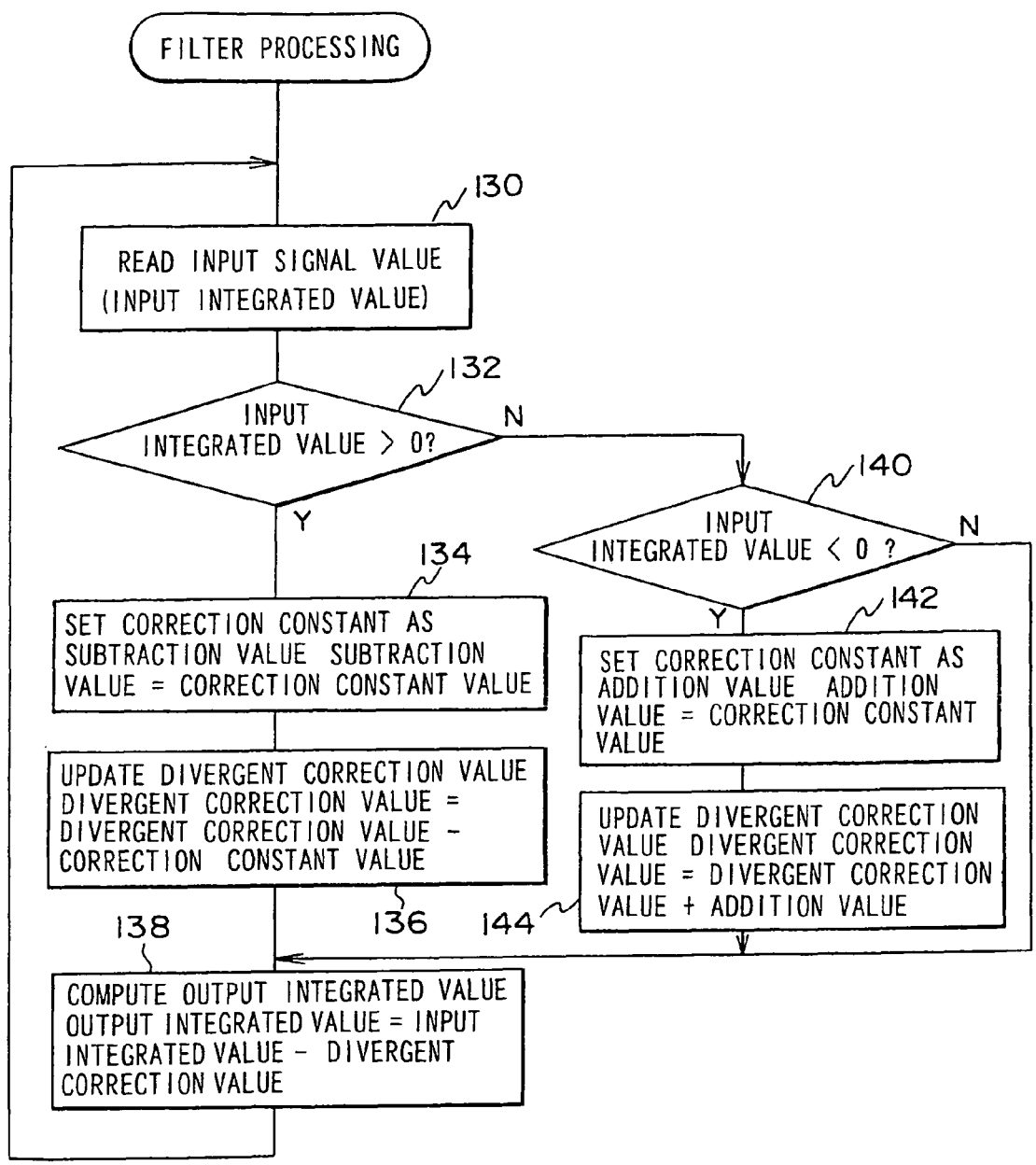
FIG. 18 is a flowchart of processings which can be applied instead of a filter circuit in the third embodiment.
Figure 19A:
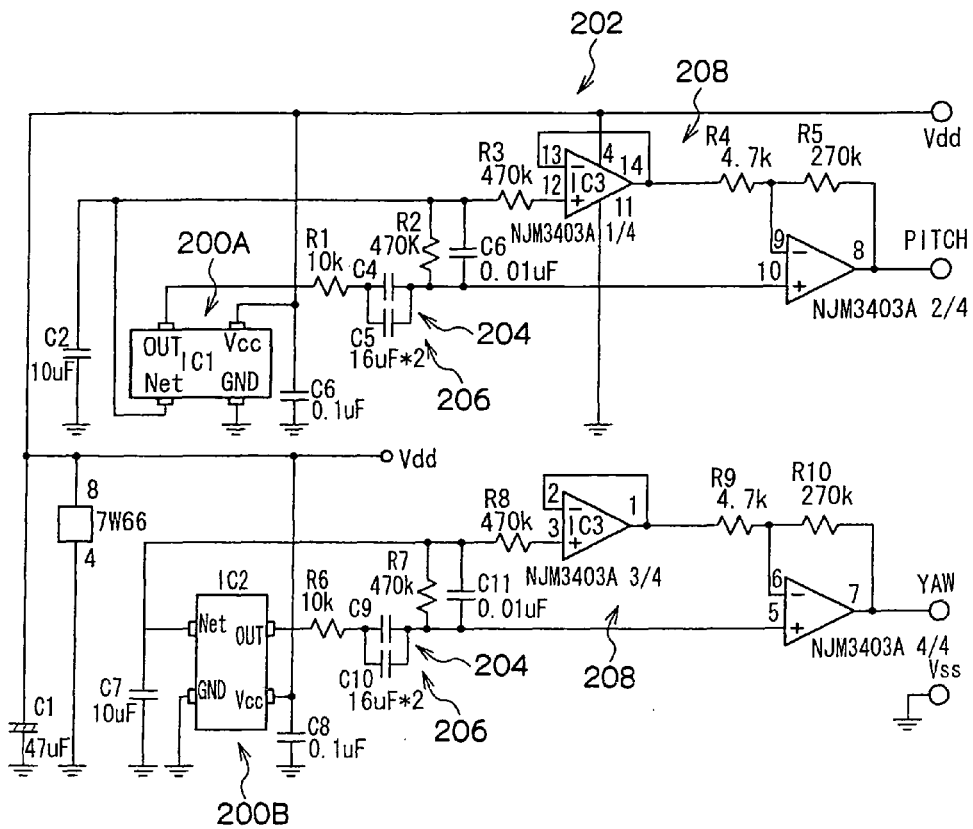
FIG. 19A is a schematic wiring diagram of main portions showing a general output circuit.
Figure 19B:
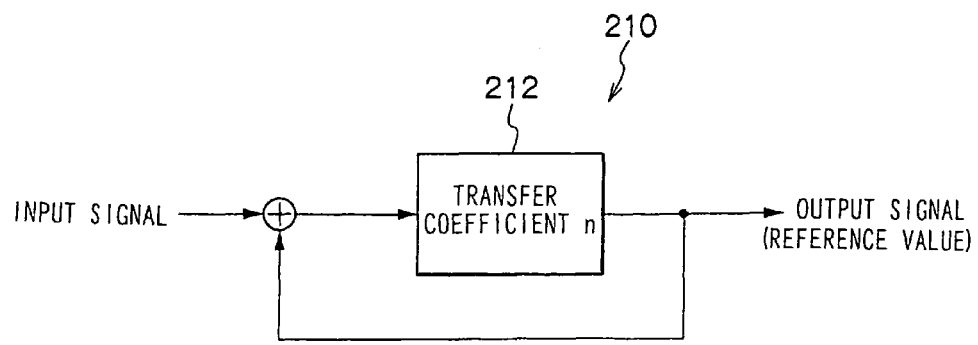
FIG. 19B is a schematic structural diagram showing an example of a general cyclic filter.

FIG. 18 shows the flow of processings in this case. This flowchart is executed at a predetermined sampling interval (the control time interval of the camera shaking correction). In initial step 130, an integrated value inputted from the integrated processing section, is read as an input integrated value. In next step 132, it is judged whether the input integrated value is positive or not.

Here, if the input integrated value is positive, the determination in step 132 is affirmative, and the routine moves on to step 134 where a correction constant which is set in advance is set as a subtraction value. Then, in step 136, by adding the set subtraction value to the divergent correction value (i.e., by subtracting the correction constant from the divergent correction value), the divergent correction value is updated.

Thereafter, the routine moves on to step 138 where, due to the divergent correction value being subtracted from the input integrated value, an output integrated value is computed.

On the other hand, if the input integrated value is not positive, the determination in step 132 is negative, and the routine moves on to step 140 where it is confirmed whether or not the input integrated value is negative. If the input integrated value is negative, the determination in step 140 is affirmative, and the routine moves on to step 142.

In step 142, the correction constant is set as an addition value, and in next step 144, due to the correction constant being added to the divergent correction value, the divergent correction value is updated.

Thereafter, the routine moves on to step 138 where the output integrated value is computed from the input integrated value and the divergent correction value.

Moreover, when the input integrated value is zero, the determinations in step 132 and step 140 are negative, and the routine proceeds to step 138. In this way, computation of the output integrated value using the divergent correction value is carried out, without the divergent correction value being updated.

By carrying out such processing, while the integrated value computed at the integration processing section 66 is prevented from diverging, an output integrated value, which is equivalent to the drift component being precisely removed from the angular velocity signal, can be obtained. By using this output integrated value, optimal shaking correction using the shift lens 58 can be carried out.

Note that the above-described embodiments are not intended to limit the structure of the present invention. For example, in the embodiments, the digital camera (digital still camera) 10 is described as an example, but the present invention can be applied to a digital still camera of an arbitrary structure provided that it is equipped with an optical-type camera shaking correcting function.

Further, the present invention is not limited to a digital still camera, and can be applied to an image pickup device of an arbitrary structure which generates image data corresponding to an image of a subject of photographing by imaging, onto an image pickup element, light which is collected by a lens, such as a digital video camera or the like.

What is claimed is:

1. A device for correcting camera shaking provided at an image pickup device which outputs image data corresponding to a photographed image which has passed through a lens housed in a housing of the image pickup device and which is imaged on an image pickup element of the image pickup device, the device for correcting camera shaking comprising:

an angular velocity detecting section detecting an angular velocity due to shaking arisen at the housing;

an integration computing section computing an integrated value corresponding to a change in an angle of an optical axis of the lens due to shaking, by time integrating at a predetermined time interval an angular velocity signal outputted from the angular velocity detecting section;

a control value setting section which, on the basis of an integrated value outputted from the integration computing section, sets a control value for obtaining a correction angle needed in order to compensate tilting of the optical axis of the lens due to the shaking;

a lens driving section which, on the basis of the control value set by the control value setting section, drives the lens so as to tilt the optical axis of the lens; and a filter processing section which extracts a reference value from the angular velocity signal detected by the angular velocity detecting section, and outputs a difference between the detected angular velocity signal and the reference value to the integration computing section as a corrected angular velocity signal, the filter processing section extracting the reference value from an angular velocity signal to which a preset constant value has been added or subtracted on the basis of results of comparison of the reference value and an angular velocity signal inputted from the angular velocity detecting section, wherein the filter processing section is a filter circuit comprises:

a register;

a subtractor to which are inputted output from the register and the angular velocity signal detected by the angular velocity detecting section;

a positive/negative judging section to which an output signal from the subtractor is inputted, and which outputs results of judgment on a positive/negative sign of the output signal from the subtractor;

a positive/negative reversing control section to which output from the positive/negative judging section and the constant value are inputted, and which reverses a positive/negative sign of the constant value on the basis of the output from the positive/negative judging section and outputs the constant value whose positive/negative sign has been reversed; and an adder to which the angular velocity signal detected by the angular velocity detecting section and output from the positive/negative reversing control section are inputted, and output from the adder is inputted to the register, and the register outputs the input to the subtractor as a reference value, and the subtractor outputs results of computation thereof as a corrected angular velocity signal.

2. The device for correcting camera shaking of claim 1, wherein the filter processing section adds the constant value to the angular velocity signal, when a level of the angular velocity signal is greater than a level of the reference value, and subtracts the constant value from the angular velocity signal, when the level of the angular velocity signal is smaller than the level of the reference value.

3. The device for correcting camera shaking of claim 1, wherein the angular velocity detecting section is a gyro sensor.

4. A device for correcting camera shaking provided at an image pickup device which outputs image data corresponding to a photographed image which has passed through a lens housed in a housing of the image pickup device and which is imaged on an image pickup element of the image pickup device, the device for correcting camera shaking comprising:

an angular velocity detecting section detecting an angular velocity due to shaking arisen at the housing;

an integration computing section computing an integrated value corresponding to a change in an angle of an optical axis of the lens due to shaking, by time integrating at a predetermined time interval an angular velocity signal outputted from the angular velocity detecting section;

a control value setting section which, on the basis of an integrated value outputted from the integration computing section, sets a control value for obtaining a correction angle needed in order to compensate tilting of the optical axis of the lens due to the shaking;

a lens driving section which, on the basis of the control value set by the control value setting section, drives the lens so as to tilt the optical axis of the lens; and an integrated value filter processing section which is provided at the control value setting section, and which corrects an integrated value used in setting the control value by adding or subtracting a preset constant value to or from the integrated value in accordance with a positive/negative sign of the integrated value outputted from the integration computing section.

5. The device for correcting camera shaking of claim 4, wherein the integrated value filter processing section subtracts the constant value from the integrated value when the integrated value is positive, and adds the constant value to the integrated value when the integrated value is negative.

6. The device for correcting camera shaking of claim 4, wherein the angular velocity detecting section is a gyro sensor.

7. The device for correcting camera shaking of claim 4, wherein the integrated value filter processing section is a filter circuit comprising:

a register;

a subtractor to which are inputted output from the register and an integrated value outputted from the integration computing section;

a positive/negative judging section to which output from the subtractor is inputted, and which outputs results of judgment on a positive/negative sign of the output from the subtractor;

a positive/negative reversing control section to which output from the positive/negative judging section and the constant value are inputted, and which reverses a positive/negative sign of the constant value on the basis of the output from the positive/negative judging section and outputs the constant value whose positive/negative sign has been reversed; and an adder to which the angular velocity signal detected by the angular velocity detecting section and output from the register are inputted, and output from the adder is inputted to the register, and the register outputs the input to the subtractor, and the subtractor outputs results of computation thereof as a corrected integrated value.

8. An image pickup device which outputs image data corresponding to a photographed image which has passed through a lens housed in a housing of the device and which is imaged on an image pickup element of the device, the image pickup device comprising:

an angular velocity detecting section detecting an angular velocity due to shaking arisen at the housing;

a filter processing section which extracts a reference value from the angular velocity signal detected by the angular velocity detecting section, and outputs a difference between the detected angular velocity signal and the reference value as a corrected angular velocity signal, the filter processing section extracting the reference value from an angular velocity signal to which a preset constant value has been added or subtracted on the basis of results of comparison of the reference value and an angular velocity signal inputted from the angular velocity detecting section;

an integration computing section computing an integrated value corresponding to a change in an angle of an optical axis of the lens due to the shaking, by time integrating at a predetermined time interval the angular velocity signal corrected by the filter processing section;

a control value setting section which, on the basis of the integrated value outputted from the integration computing section, sets a control value for obtaining a correction angle needed in order to compensate tilting of the optical axis of the lens due to the shaking; and a lens driving section which, on the basis of the control value set by the control value setting section, drives the lens so as to tilt the optical axis of the lens wherein the filter processing section is a filter circuit comprising:

a register;

a subtractor to which are inputted output from the register and the angular velocity signal detected by the angular velocity detecting section;

a positive/negative judging section to which an output signal from the subtractor is inputted, and which outputs results of judgment on a positive/negative sign of the output signal from the subtractor;

a positive/negative reversing control section to which output from the positive/negative judging section and the constant value are inputted, and which reverses a positive/negative sign of the constant value on the basis of the output from the positive/negative judging section and outputs the constant value whose positive/negative sign has been reversed; and an adder to which the angular velocity signal detected by the angular velocity detecting section and output from the positive/negative reversing control section are inputted, and output from the adder is inputted to the register, and the register outputs the input to the subtractor as a reference value, and the subtractor outputs results of computation thereof as a corrected angular velocity signal.

9. The image pickup device of claim 8, wherein the filter processing section adds the constant value to the angular velocity signal, when a level of the angular velocity signal is greater than a level of the reference value, and subtracts the constant value from the angular velocity signal, when the level of the angular velocity signal is smaller than the level of the reference value.

10. An image pickup device which outputs image data corresponding to a photographed image which has passed through a lens housed in a housing of the device and which is imaged on an image pickup element of the device, the image pickup device comprising:

an angular velocity detecting section detecting an angular velocity due to shaking arisen at the housing;

an integration computing section computing an integrated value corresponding to a change in an angle of an optical axis of the lens due to shaking, by time integrating at a predetermined time interval an angular velocity signal outputted from the angular velocity detecting section;

an integrated value filter processing section which corrects the integrated value by adding or subtracting a preset constant value to or from the integrated value, in accordance with a positive/negative sign of the integrated value outputted from the integration computing section;

a control value setting section which, on the basis of the integrated value corrected by the integrated value filter processing section, sets a control value for obtaining a correction angle needed in order to compensate tilting of the optical axis of the lens due to the shaking; and a lens driving section which, on the basis of the control value set by the control value setting section, drives the lens so as to tilt the optical axis of the lens.

11. The image pickup device of claim 10, wherein the integrated value filter processing section subtracts the constant value from the integrated value when the integrated value is positive, and adds the constant value to the integrated value when the integrated value is negative.

12. The image pickup device of claim 10, wherein the integrated value filter processing section is a filter circuit comprising:

a register;

a subtractor to which are inputted output from the register and an integrated value outputted from the integration computing section;

a positive/negative judging section to which output from the subtractor is inputted, and which outputs results of judgment on a positive/negative sign of the output from the subtractor;

a positive/negative reversing control section to which output from the positive/negative judging section and the constant value are inputted, and which reverses a positive/negative sign of the constant value on the basis of the output from the positive/negative judging section and outputs the constant value whose positive/negative sign has been reversed; and an adder to which the angular velocity signal detected by the angular velocity detecting section and output from the register are inputted, and output from the adder is inputted to the register, and the register outputs the input to the subtractor, and the subtractor outputs results of computation thereof as a corrected integrated value.

* * * * *